United States Patent [19]
Stubley et al.

[11] Patent Number: 6,092,045
[45] Date of Patent: Jul. 18, 2000

[54] METHOD AND APPARATUS FOR SPEECH RECOGNITION

[75] Inventors: Peter R. Stubley, Lachine; Andre Gillet, St-Laurent; Vishwa N. Gupta, Brossard, all of Canada; Christopher K. Toulson, Palo Alto; David B. Peters, San Carlos, both of Calif.

[73] Assignee: Nortel Networks Corporation, Montreal, Canada

[21] Appl. No.: 09/119,621

[22] Filed: Jul. 21, 1998

[30] Foreign Application Priority Data

Sep. 19, 1997 [CA] Canada ................................ 2216224

[51] Int. Cl.⁷ ........................... G10L 15/10; G10L 15/14
[52] U.S. Cl. ........................................ 704/254; 704/256
[58] Field of Search ..................... 704/256, 251, 704/254, 255, 200, 231, 240, 242, 238, 236, 243, 244, 252

[56] References Cited

U.S. PATENT DOCUMENTS

| | | | |
|---|---|---|---|
| 4,164,025 | 8/1979 | Dubnowski et al. | 364/900 |
| 4,751,737 | 6/1988 | Gerson et al. | 381/43 |
| 4,797,910 | 1/1989 | Daudelin | 379/67 |
| 4,805,219 | 2/1989 | Baker | 381/43 |
| 4,959,855 | 9/1990 | Daudelin | 379/213 |
| 4,979,206 | 12/1990 | Padden et al. | 379/67 |
| 5,050,215 | 9/1991 | Nishimura | 381/41 |
| 5,052,038 | 9/1991 | Shepard | 379/88 |
| 5,086,479 | 2/1992 | Takenaga et al. | 382/14 |
| 5,091,947 | 2/1992 | Ariyoshi et al. | 381/42 |
| 5,097,509 | 3/1992 | Lennig | 381/43 |
| 5,127,055 | 6/1992 | Larkey | 381/43 |
| 5,163,083 | 11/1992 | Dowden et al. | 379/88 |
| 5,181,237 | 1/1993 | Dowden et al. | 379/88 |
| 5,204,894 | 4/1993 | Darden | 379/88 |
| 5,271,088 | 12/1993 | Bahler | 704/200 |
| 5,274,695 | 12/1993 | Green | 379/88 |
| 5,307,444 | 4/1994 | Tsuboka | 395/22 |
| 5,390,278 | 2/1995 | Gupta et al. | 395/2.52 |
| 5,459,798 | 10/1995 | Bailey et al. | 382/218 |
| 5,488,652 | 1/1996 | Bielby et al. | 379/88 |
| 5,515,475 | 5/1996 | Gupta et al. | 395/2.51 |
| 5,621,859 | 4/1997 | Schwartz et al. | 395/2.65 |
| 5,857,169 | 1/1999 | Seide | 704/256 |
| 5,892,960 | 4/1999 | Seide | 395/800 |
| 5,930,753 | 7/1999 | Potamianos et al. | 704/243 |
| 5,933,806 | 8/1999 | Beyerlein et al. | 704/256 |

FOREIGN PATENT DOCUMENTS

| | | | |
|---|---|---|---|
| 0703568 | 3/1996 | European Pat. Off. | G10L 5/06 |
| 0 703 568 | 3/1996 | European Pat. Off. | G10L 5/06 |
| 0 810 583 | 12/1997 | European Pat. Off. | G10L 5/06 |

OTHER PUBLICATIONS

Kuhn, R., et al.; "A Cache–Based Natural Language Model for Speech Recognition," IEEE Transactions on Pattern Analysis and Machine Intelligence, vol. 12, No. 6, Jun. 1990, pp. 570–583 (XP000136978).

Bakis, R. and Cole, A.G., "Dynamic Modification of the Vocabulary of a Speech Recognition Machine," *IBM Technical Disclosure Bulletin*, vol. 27, No. 7A, (1984).

Gao, et al., "Dynamic Adaptation of Hidden Markov Model for Robust Speech Recognition," 1989 *IEEE Internatioal Symposium on Circuits and Systems*, vol. 2 of 3, pp. 1336–1339, (1989).

(List continued on next page.)

*Primary Examiner*—Richemond Dorvil
*Attorney, Agent, or Firm*—Foley & Lardner

[57] ABSTRACT

Comparing a series of observations representing unknown speech, to stored models representing known speech, the series of observations being divided into at least two blocks each comprising two or more of the observations, is carried out in an order which makes better use of memory. First, the observations in one of the blocks are compared (31), to a subset comprising one or more of the models, to determine a likelihood of a match to each of the one or more models. This step is repeated (33) for models other than those in the subset; and the whole process is repeated (34) for each block.

21 Claims, 12 Drawing Sheets

OTHER PUBLICATIONS

Gorin, A.L. et al., "Adaptive Acquisition of Language," *Computer Speech and Language,* vol. 5, No. 2, pp. 101–132, (1991).

Lennig, M., et al., "Automated Bilingual Directory Assistance Trial in Bell Canada," *IEEE Workshop on Interactive Voice Technology for Telecom Applications,* (1992).

Lennig, M. and Sharp, D., "Unleashing The Potential Of Human–To–Machine Communication" *Telesis,* No. 97, pp. 23–37, (1993).

Lenning, M., "Putting Speech Recognition to Work in the Telephone Network," *IEEE Computer Society,* vol. 23, No. 8 (1990).

Lennig, M., et al., "Flexible Vocabulary Recognition of Speech Over the Telephone," *IEEE Workshop on Interactive Voice Technology for Telecom Applications,* (1992).

Nagata, S., et al., "Mobile Robot Control by a Structured Hierarchical Neural Network," pp. 69–76, (1989).

Rabiner, L.R. and Juang, B.H., "An Introduction to Hidden Markov Models," *IEEE ASSP Magazine,* vol. 3, No. 1 (1986).

Young, S., Large Vocabulary Continuous Speech Recognition: a Review *IEEE Automatic Speech Recognition Workshop,* (1995).

SPEECH INPUT → CHANNEL ADAPTATION 11

↓

FEATURE EXTRACTION 12

↓

WORD ENDPOINT DETECTION 13

↓

WORD RECOGNITION BY FINDING CLOSEST MATCHES TO STORED VOCABULARY 14

↓

ACCEPT/REJECT DECISION 15

↓

OUTPUT THE BEST MATCH, OR REJECTION

FIG. 1    PRIOR ART

1. Copy *in* to Buffer[0].
2. Mark all buffers free. Mark Buffer[0] in use.
3.
4. for each branch *b* {
5.    Define *inp* as the index of the input buffer to *b* .
6.     if ( *b* is a terminal branch) {
7.        do_terminal_processing(leaf(*b* ), Buffer[*inp* ]).
8.     }
9.    else {
10.       Define*outp* as the index of output buffer for*b* .
11.       if (*outp* is in use) {
12.         Mark *b* as an update type.
13.       }
14.       else {
15.         Mark *outp* in use.
16.       }
17.
18.       process_branch_by_type(*b,inp,outp* )
19.    }
20.
22.    Mark *inp* free.
24. }

FIG. 14

1. Restore state scores from global memory.
2. $s_1 = \max[s_1, u(0)]$.
3. $v(0) = u(0)$.
4. for $t = 0, 1, ..., B-1$ {
5.     $v(t+1) = \max[u(t+1), s_3 + b_6(t)]$.
6.     $s_3 = \max[s_2 + b_4(t), s_3 + b_5(t)]$.
7.     $s_2 = \max[s_1 + b_2(t), s_2 + b_3(t)]$.
8.     $s_1 = \max[u(t+1), s_1 + b_1(t)]$.
9. }
10. Save the state scores in global memory.

METHOD AND APPARATUS FOR SPEECH RECOGNITION

FIELD OF THE INVENTION

The invention relates to methods of comparing a series of observations representing unknown speech, to stored models representing known speech, to methods of recognising patterns in a series of observations, by comparing the observations to stored models, to apparatus for such methods, and to software for such methods.

BACKGROUND TO THE INVENTION

Pattern recognition generally, and recognition of patterns in continuous signals such as speech signals has been a rapidly developing field. A limitation in many applications has been the cost of providing sufficient processing power for the complex calculations often required. This is particularly the case in speech recognition, all the more so when real time response is required, for example to enable automated directory enquiry assistance, or for control operations based on speech input. To simulate the speed of response of a human operator, and thus avoid, a perception of "unnatural" delays, which can be disconcerting, the spoken input needs to be recognised within about half a second of the end of the spoken input.

The computational load varies directly with the number of words or other elements of speech, which are modelled and held in a dictionary, for comparison to the spoken input. This is also known as the size of vocabulary of the system. The computational load also varies according to the complexity of the models in the dictionary, and how the speech input is processed into a representation ready for the comparison to the models. Finally, the actual algorithm for carrying out the comparison is clearly a key factor. Numerous attempts have been made over many years to improve the trade off between computational load, accuracy of recognition, and speed of recognition. For useable systems, having a tolerable recognition accuracy, the computational demands are high. Despite continuous refinements to models, speech input representations, and recognition algorithms, and advances in processing hardware, there remains great demand to improve the above mentioned trade off.

There are five main steps: audio channel adaptation, feature extraction, word end-point detection, speech recognition, and accept/reject decision logic. The speech recognition step, the fourth stage, is the most computationally intensive step, and thus a limiting factor as far as the above mentioned trade off is concerned. Depending on the size of vocabularies used, and the size of each model, both the memory requirements and the number of calaculations required for each recognition decision, may limit the speed/accuracy/cost trade off. Examples of such systems are described in U.S. Pat. No. 5,390,278 (Gupta et al.), and in U.S. Pat. No. 5,515,475 (Gupta).

SUMMARY OF THE INVENTION

It is an object of the invention to provide improved method and apparatus.

According to the invention, there is provided a method of comparing a series of observations representing unknown speech, to stored models representing known speech, the series of observations being divided into at least two blocks each comprising two or more of the observations, the method comprising the steps of:

a) comparing two or more of the observations in one of the blocks of observations, to a subset comprising one or more of the models, to determine a likelihood of a match to each of the one or more models;

b) repeating step a) for models other than those in the subset; and c) repeating steps a) and b) for a different one of the blocks.

Amongst the advantages of such a method is that the speed of processing of step a), the critical innermost loop, can be improved. The innermost loop is the part which is repeated most often, and by carrying out the operations in the order specified, cache misses can be reduced, and pipelining efficiency improved. More specifically, slow main memory accesses may be required only once per block per model, instead of once per observation per model.

Preferably, the observations are represented as multidimensional vectors, for the comparison at step a). In such cases, processing requirements may be particularly onerous, and the advantages of the method become more valuable.

Advantageously, the comparison at step a) uses a Viterbi algorithm. The Viterbi algorithm is a dynamic programming algorithm which is preferred for comparing observations to particular types of models. If such models are time series of states joined by transitions, the Viterbi algorithm determines the probability of each observation matching a one or more of those states. If the models comprise strings of states, cumulative probability scores for each string can be determined, to find the best path. In such cases, processing requirements may be particularly onerous, and the advantages of the method become more valuable.

Advantageously, the models are represented as finite state machines with probability distribution functions attached. Continuously varying signals can be modeled as a series of stationary states, with a probability function at each state, indicating whether the signal moves to the next state or stay s at the given state, after a given time interval. An example is the Hidden Markov Model (HMM). This enables the models to contain a representation of patterns with varying rates of change, yet a common underlying pattern. However, again, processing requirements may be particularly onerous, and the advantages of the method become more valuable.

Advantageously, the models comprise groups of representations of phonemes. This enables the models to be stored and used more efficiently. Recognising patterns in speech signals is particularly processor intensive, because of the wide range of differences in sounds carrying the same meaning. Also, in many speech recognition applications, it is necessary to carry out recognition in real time, that is in half a second or so after the speaker has finished. Accordingly, again, processing requirements may be particularly onerous, and the advantages of the method become more valuable.

Advantageously, the models comprise representations of elements of speech, and step a) comprises the step of:

comparing the block of observations to a predetermined sequence of the models in the subset. The amount of processing can be reduced if the models are stored as sequences of elements of speech. Many utterances share elements with other utterances. To avoid comparing the same elements multiple times, the individual models of the elements can be merged into sequences. The common parts can be represented once, with branches where the elements are no longer common.

Advantageously, step a) comprises the steps of:

comparing the block of observations to a predetermined sequence of the models in the subset;

determining for each of the models in the sequence, a score which represents the likelihood of a match with the observations compared so far;

storing the score in a score buffer for use in determining scores of subsequent models in the sequence; and determining when the score is no longer needed, then re-using the score buffer to store a subsequent score.

This can bring an advantage in reducing memory requirements, which can relieve a significant constraint. This may occur in particular where the models comprise large numbers of paths, each of which has to have a cumulative probability score maintained, or where there are a large number of models.

Advantageously, step a) comprises the step of:

comparing the block of observations to a lexical graph comprising a predetermined sequence of the models in the subset, wherein the sequence comprises different types of models, and the comparison is dependent on the type; and the method comprises the step of:

determining the types of the models before the block is compared.

Where different algorithms are used, tuned to suit different types of model, or different branches of a sequence of models, processing can be speeded up if it is unnecessary to test for branch type during processing. In particular, it becomes easier for a compiler to pipeline the algorithm. If a branch is encountered, which route to take must be resolved before continuing, thus the pipelining by preprocessing of instructions ahead of the current instruction may be held up.

Preferably, the models comprise finite state machines, having multiple state sequences, wherein step a) comprises the steps of:

determining state scores for the matches between each respective observation and state sequences of the respective model, making an approximation of the state scores, for the observation, for storing to use in matching subsequent observations, the approximation comprising fewer state scores than were determined for the respective observation.

This enables the amount of storage required for state scores to be reduced. This is particularly advantageous where there are a large number of models, each with multiple states and therefore a large number of state scores to be stored for use in the next block. In such cases, a two pass approach may be used, in which a rough, or fast match algorithm is used on the first pass, to identify a small number of similar models, which are then compared in more detail in the second pass. The approximation is particularly advantageous for the first pass, to reduce the memory used, and to speed up the process since fewer memory accesses are required, and fewer calculations. This is particularly advantageous if the calculations are time consuming floating point calculations.

According to another aspect of the invention, there is provided a method of recognising patterns in a series of observations, by comparing the observations to stored models, using a processing means having a main memory for storing the models and a cache memory, the cache memory being too small to contain all the models and observations, the series of observations being divided into blocks of at least two observations, the method comprising the steps of:

a) using the processor to compare a subset of the models to the observations in one of the blocks of observations, to recognise the patterns, the subset of the models being small enough to fit in the cache memory;

b) repeating step a) for a different subset of the models and;

c) repeating steps a) and b) for a different one of the blocks.

According to another aspect of the invention, there is provided a method of recognising patterns in a series of observations by comparing the observations to stored models, the series of observations being divided into at least two blocks each comprising two or more of the observations, the models comprising finite state machines, having multiple state sequences, the method comprising the steps of:

a) comparing two or more of the observations in one of the blocks of observations, to a subset comprising one or more of the models, to determine a likelihood of a match to each of the one or more models, by determining which of the state sequences of the respective model is the closest match, and how close is the match;

b) repeating step a) for models other than those in the subset; and c) repeating steps a) and b) for a different one of the blocks.

According to another aspect of the invention, there is provided a method of comparing a series of observations representing unknown speech, to stored models representing known speech, by comparing the observations to stored models, the series of observations being grouped into one or more blocks each comprising two or more of the observations, the models comprising finite state machines, having multiple state sequences, the method comprising, for each of the one or more blocks, the steps of:

a) comparing two or more of the observations in the respective block, to a subset comprising one or more of the models, to determine a likelihood of a match to each of the one or more models, by determining which of the state sequences of the respective model is the closest match, and how close is the match; and b) repeating step a) for models other than those in the subset.

In some applications, the series of observations may be short enough that only a single block is necessary. The advantages set out above still apply.

According to another aspect of the invention, there is provided software stored on a computer readable medium for comparing a series of observations representing unknown speech, to stored models representing known speech, the series of observations being divided into at least two blocks each comprising two or more of the observations, the software being arranged for carrying out the steps of:

a) comparing two or more of the observations in one of the blocks of observations, to a subset comprising one or more of the models, to determine a likelihood of a match to each of the one or more models;

b) repeating step a) for models other than those in the subset; and c) repeating steps a) and b) for a different one of the blocks.

According to another aspect of the invention, there is provided software stored on a computer readable medium for recognising patterns in a series of observations by comparing the observations to stored models, the series of observations being divided into at least two blocks each comprising two or more of the observations, the models comprising finite state machines, having multiple state sequences, the software being arranged to carry out the steps of:

a) comparing two or more of the observations in one of the blocks of observations, to a subset comprising one or more of the models, to determine a likelihood of a match to each of the one or more models, by determining which of the state sequences of the respective model is the closest match, and how close is the match;

b) repeating step a) for models other than those in the subset; and c) repeating steps a) and b) for a different one of the blocks.

According to another aspect of the invention, there is provided software stored on a computer readable medium for comparing a series of observations representing unknown speech, to stored models representing known speech, by comparing the observations to stored models, the series of observations being grouped into one or more blocks each comprising two or more of the observations, the models comprising finite state machines, having multiple state sequences, the software being arranged to carry out for each of the one or more blocks, the steps of:

a) comparing two or more of the observations in the respective block, to a subset comprising one or more of the models, to determine a likelihood of a match to each of the one or more models, by determining which of the state sequences of the respective model is the closest match, and how close is the match; and b) repeating step a) for models other than those in the subset.

According to another aspect of the invention, there is provided a speech recognition processor for comparing a series of observations representing unknown speech, to stored models representing known speech, the series of observations being divided into at least two blocks each comprising two or more of the observations, the processor being arranged to carry out the steps of:

a) comparing two or more of the observations in one of the blocks of observations, to a subset comprising one or more of the models, to determine a likelihood of a match to each of the one or more models;

b) repeating step a) for models other than those in the subset; and c) repeating steps a) and b) for a different one of the blocks.

According to another aspect of the invention, there is provided a speech recognition processor for recognising patterns in a series of observations by comparing the observations to stored models, the series of observations being divided into at least two blocks each comprising two or more of the observations, the models comprising finite state machines, having multiple state sequences, the processor being arranged to carry out the steps of:

a) comparing two or more of the observations in one of the blocks of observations, to a subset comprising one or more of the models, to determine a likelihood of a match to each of the one or more models, by determining which of the state sequences of the respective model is the closest match, and how close is the match;

b) repeating step a) for models other than those in the subset; and c) repeating steps a) and b) for a different one of the blocks.

According to another aspect of the invention, there is provided a speech recognition processor for comparing a series of observations representing unknown speech, to stored models representing known speech, by comparing the observations to stored models, the series of observations being grouped into one or more blocks each comprising two or more of the observations, the models comprising finite state machines, having multiple state sequences, the processor being arranged to carry out, for each of the one or more blocks, the steps of:

a) comparing two or more of the observations in the respective block, to a subset comprising one or more of the models, to determine a likelihood of a match to each of the one or more models, by determining which of the state sequences of the respective model is the closest match, and how close is the match; and b) repeating step a) for models other than those in the subset.

Preferred features may be combined as would be apparent to a skilled person, and may be combined with any aspect of the invention.

To show, by way of example, how to put the invention into practice, embodiments will now be described in more detail, with reference to the accompanying drawings.

BRIEF DESCRIPTION OF THE DRAWINGS

FIG. 1 shows principal steps in a known speech recognition process;

FIG. 14 shows pseudo code for the block Viterbi algorithm;

DETAILED DESCRIPTION

FIG. 1: Voice Recognition

Figure 2:
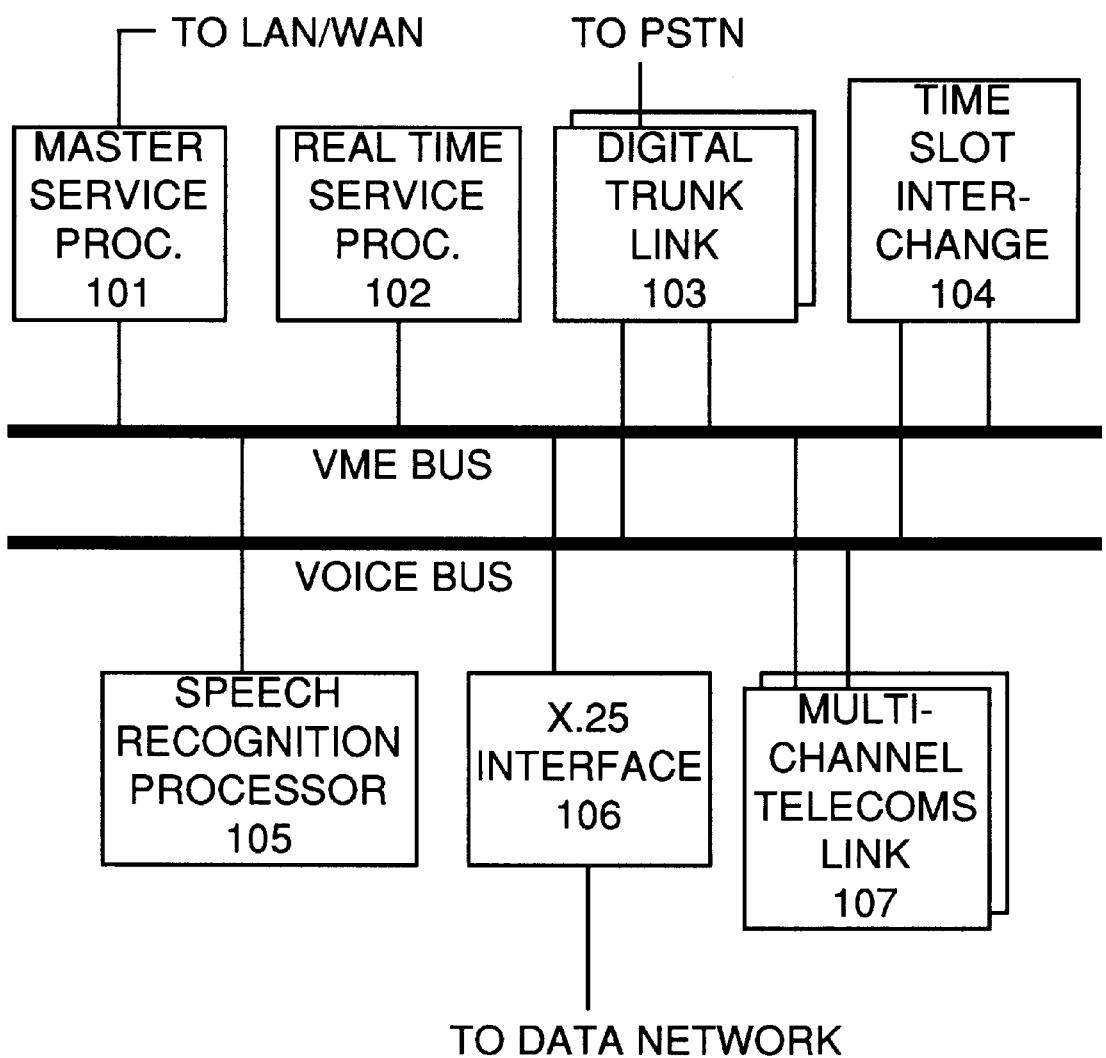
FIG. 2 shows known service controller apparatus for carrying out the method of FIG. 1.

FIG. 1 shows an overall view of an example of a known pattern recognition process, for voice recognition. There are five main steps: channel adaptation (1), feature extraction (2), word end-point detection (3), speech recognition (4), and accept/reject decision logic (5).

In the first step—channel adaptation—the system monitors the characteristics of the telephone line that carries the speech, and creates an initial mathematical model of channel parameters, such as line noise level. This model, which is updated continually throughout the recognition process, is used to adapt the vector of coefficients generated during feature extraction so that the coefficients respond to foreground speech and block out line channel variations.

During the second step—feature extraction—the system divides the unknown word or phrase into short segments, called frames. Each frame lasts 12.75 milliseconds. Thus, a word such as Mississippi, which takes about a second to say, would be broken down into about 100 frames.

Next, the system conducts a spectral analysis of each frame and creates a mathematical vector representation of the spectrum. Each feature vector is a string of 15 coefficients. The first seven coefficients measure the energy of the frame at different frequency bands to distinguish, for example, between a high-frequency /s/ sound, and a lower-frequency vowel. The remaining coefficients measure the rate of change of these spectral energies.

The third stage—word endpoint detection—is performed by an algorithm that uses the energy and short time spectrum of the speech signal. This algorithm removes silence before, after, and in the middle of the speech signal, and filters out unwanted background noise in order to expedite the speech-recognition stage.

Speech recognition is the fourth stage of the process. At this stage, the vector representations generated for each frame are compared with the FVR system's stored models for the recognition vocabulary. Each word in the vocabulary is represented by a string of hidden Markov models (HMMs), one for each phoneme in the word, as shown in U.S. Pat. No. 5,390,278 (Gupta et al.) The stored string of phoneme models that produces the best match is determined using the multiple-pass approach, at which point the spoken word is considered recognized, as shown in U.S. Pat. No. 5,515,475 (Gupta). The matching process is aided by statistical models and efficient search algorithms embedded in the hidden Markov models.

The final stage of the process is rejection decision scoring, which determines whether the best match found during the speech-recognition stage should be accepted or rejected. To perform this evaluation, the recognizer employs a mathematical distribution matrix. The closer the match, the more likely it is to be accepted. This feature provides the system with the ability to reject imposter input, or words not in its vocabulary.

FIG. 2, known service controller apparatus:

FIG. 2 shows some of the principal hardware elements for a voice processing platform known as the Network Applications Vehicle (NAV). The NAV platform is designed for enhanced network services, and enables network providers to support an array of revenue-generating and cost-saving interactive and automated speech-recognition services.

The NAV cabinet is designed for central office installation and complies with Bell Communications Research Inc. (Bellcore) Network Equipment Building System specifications, a comprehensive set of requirements for central office equipment. Each NAV bay can be equipped with up to four speech-processing shelves. The NAV system can accommodate applications requiring from 24 to several thousand ports in single and multiple bay configurations.

The heart of NAV is a speech-processing subsystem known as the service controller. The service controller is comprised of a shelf of printed circuit cards and supporting software. NAV voice-processing technology is designed around the NAV bus, which combines an industry-standard VME computer bus with a proprietary digital voice or pulse code modulation (PCM) bus. (The PCM bus is based on Northern Telecom's DS-30 serial digital voice transmission standard used by DMS, Meridian Norstar, and Meridian 1 products.)

The service controller houses the main circuit cards as shown in FIG. 2, which include the following:

the digital trunk link (DTL) cards (103), proprietary cards that process incoming voice and data signals from the DS-1 digital network trunk and transmit them to the VME voice bus;

the time-slot interchange (TSI) card (104), a proprietary card that uses a custom silicon chip set developed for Northern Telecom's Meridian Norstar digital key telephone system to implement a 512 by 512 switching matrix for voice slot management. This matrix allows the DS-0 channels that enter the DTL card to be dynamically switched to the voice channels on the multi-channel telecommunications link card;

the multichannel telecommunications link (MTL) card (106), a proprietary card that terminates the voice signals generated by the TSI card uses digital signal processing to implement such functions as word endpoint detection, speech recording and playback, compression and decompression, and speech concatenation; and detects dual-tone multifrequency tones entered by the person interacting with the system;

the speech recognition processor (SRP) card (105), a card for providing the computing power needed to support real-time speech recognition. The SRP further processes the speech information captured and preprocessed by the MTL card, selects the sequence of phoneme models in the recognition vocabulary that most closely matches the spoken word being recognized, scores the acceptability of the selected phoneme sequence using an accept/reject decision logic mathematical distribution matrix, and sends the result to the real-time service processor (RSP) card (102), a commercially available card that provides a third-party real-time operating system, called pSOS+, to perform real-time tasks, such as audio and resource management, and service control;

the master service processor (MSP) card (101), a commercially available card that uses a UNIX operating system to support computing and operations, administration, and maintenance functions. The MSP card provides an Ethernet controller, and a Small Computer Systems Interface (SCSI) to support disc and tape systems; and the input/output controller (IOC) (107), a commercially available card that supports X.25 packet-switched data links to information sources, such as attendant functions, external to the NAV.

Figure 3:
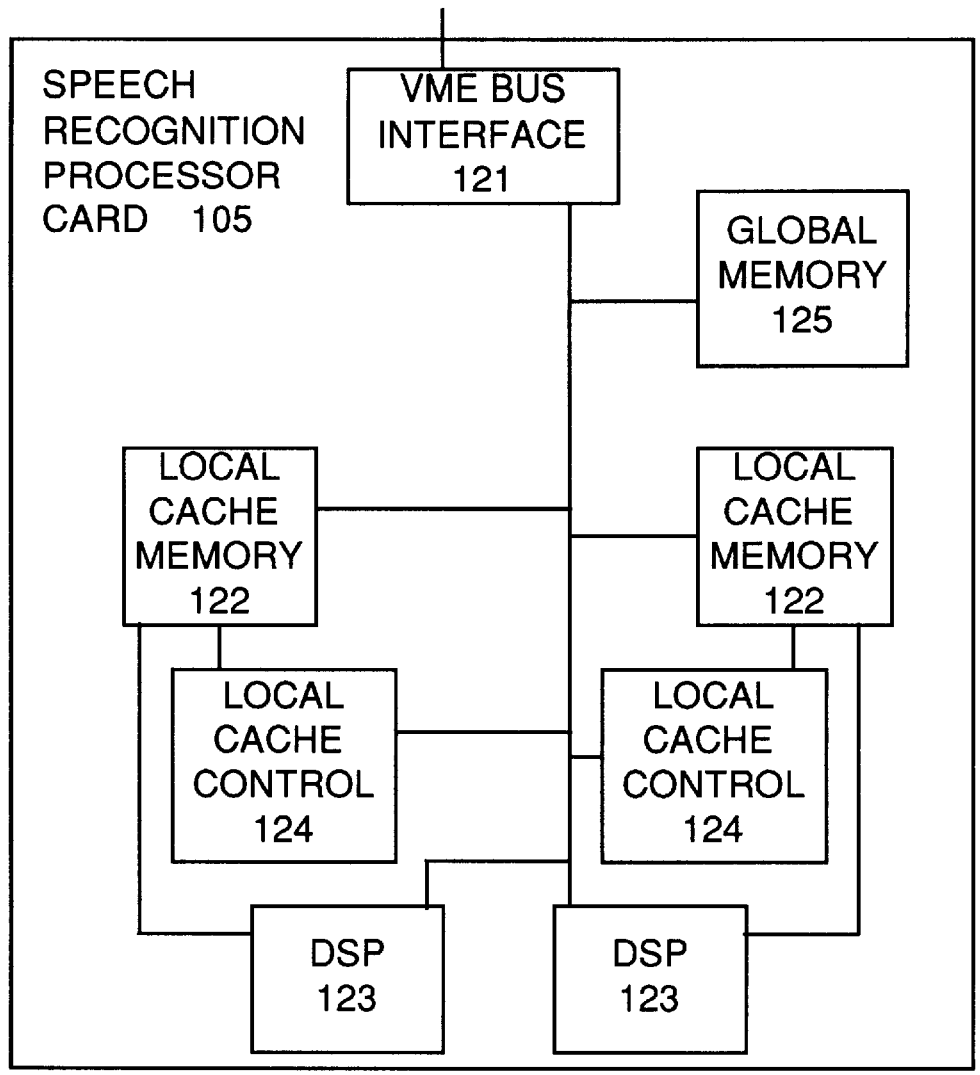
FIG. 3 shows the speech recognition processor of FIG. 2 in more detail.

FIG. 3, speech recognition processor:

FIG. 3 shows some of the elements on the speech recognition processor card 105 shown in FIG. 2. A VME bus interface 121 connects digital signal processors (DSP) to the rest of the system. There might be six or eight of these on each card. Only two are shown, for the sake of clarity. Each DSP has its own local cache memory 122, and local cache control functions 124, which may comprise dedicated hardware or may be incorporated in the software run by the DSP chip. Depending on the type of proprietary DSP, the local cache memory 122 will be connected to the bus interface 121 and to the DSP 123. Global memory 125 is also shown.

Normally the DSP will have a number of internal registers for storing data or instructions. These will give the fastest access times, since they are on board the integrated circuit which forms the DSP.

The local cache memory 122 may in some cases be on board, but is typically fast external memory. For a CISC/

RISC processor, the cache can be managed automatically by a compiler when compiling the programs run by the processor, or it can be managed by the operating system, or by the processor hardware. For many DSP architectures, local memory is used in place of the automatic cache. Local memory would be managed by the programmer and for the present purposes, is considered to be equivalent to a cache.

The cache memory will be of limited size, for reasons of cost, space, and power consumption. Thus according to the requirements of the application, it may be necessary to provide larger, slower main or global memory, usually in the form of RAM on board the same card, but conceivably located elsewhere, and accessible via the VME bus. Most or all data read from the global memory 125 will then be copied simultaneously into the local cache memory 122 to enable future references to that data to be faster, since it need only retrieved from the fast local cache memory. The detailed structure for controlling the local cache memory, to keep it up-to-date or to control the addressing of the local cache memory, can follow well established principles, and need not be described here in more detail.

Figure 4:
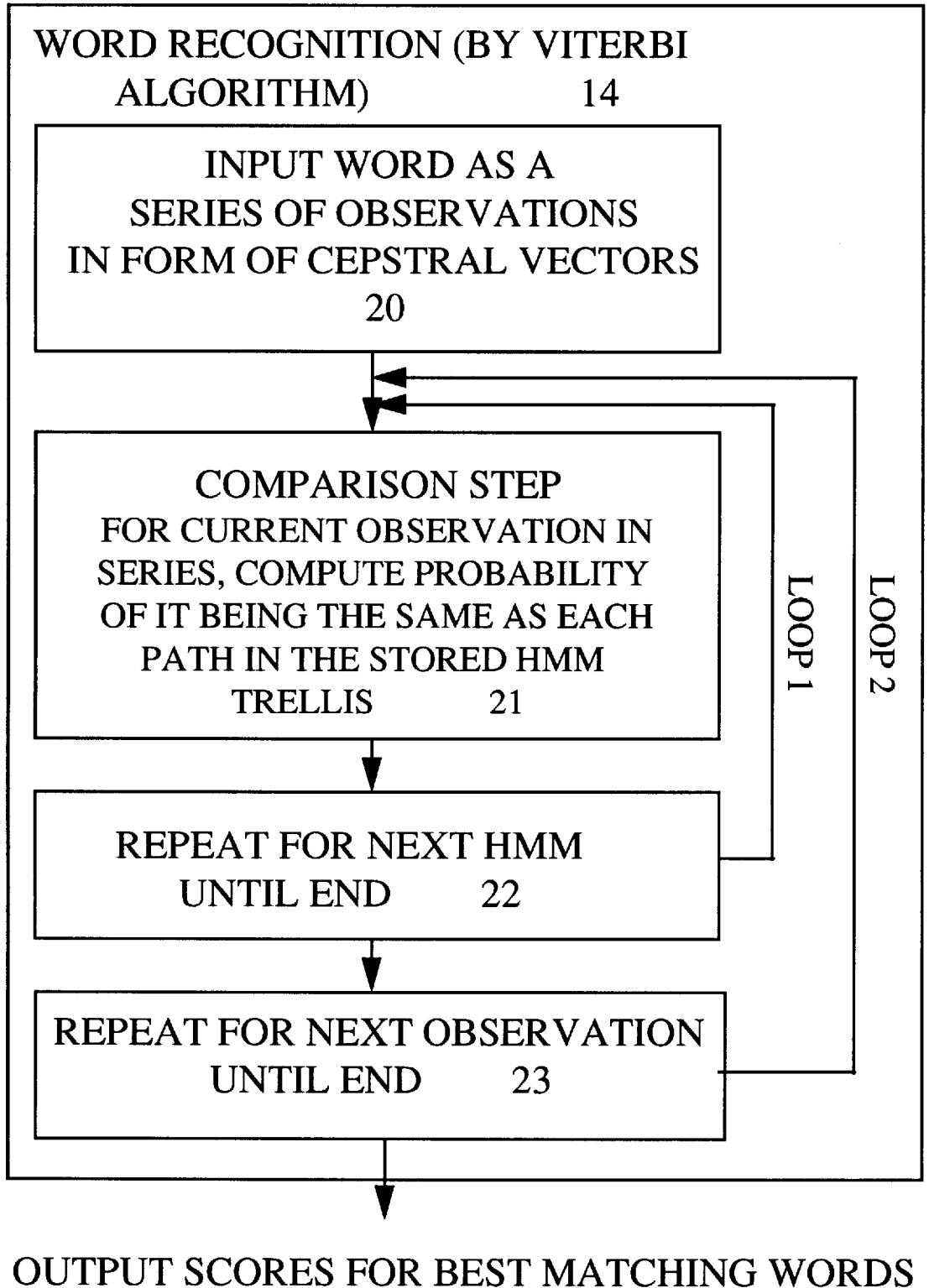
FIG. 4 shows the recognition step of FIG. 1 in more detail.

FIG. 4, speech recognition steps:

FIG. 4 shows in schematic form the main steps in the known word recognition step 14 shown in FIG. 1. Following word end point detection, each word is input as a series of observations in the form of cepstral vectors 20. At 21, a comparison or matching step is carried out. For each observation in the series, a probability is calculated of the observations so far being the same as each of the multiple paths represented in the stored HMM trellis. As shown at 22, this comparison step is repeated by following loop 1 for each model in the form of an HMM. The best score for each state in the trellis for the particular observation, is stored for use in calculating the probability scores for the next observation. As shown at 23, the process is repeated via loop 2 for the next observation, until all the observations have been processed.

This method of calculating all the relevant scores for one observation before moving on to the next observation results in the order of making the calculations corresponding to the order of receiving the observations. Also, it is intuitively well-matched to the way that equations of methods such as the Viterbi algorithm, are commonly understood and explained.

Figure 5:
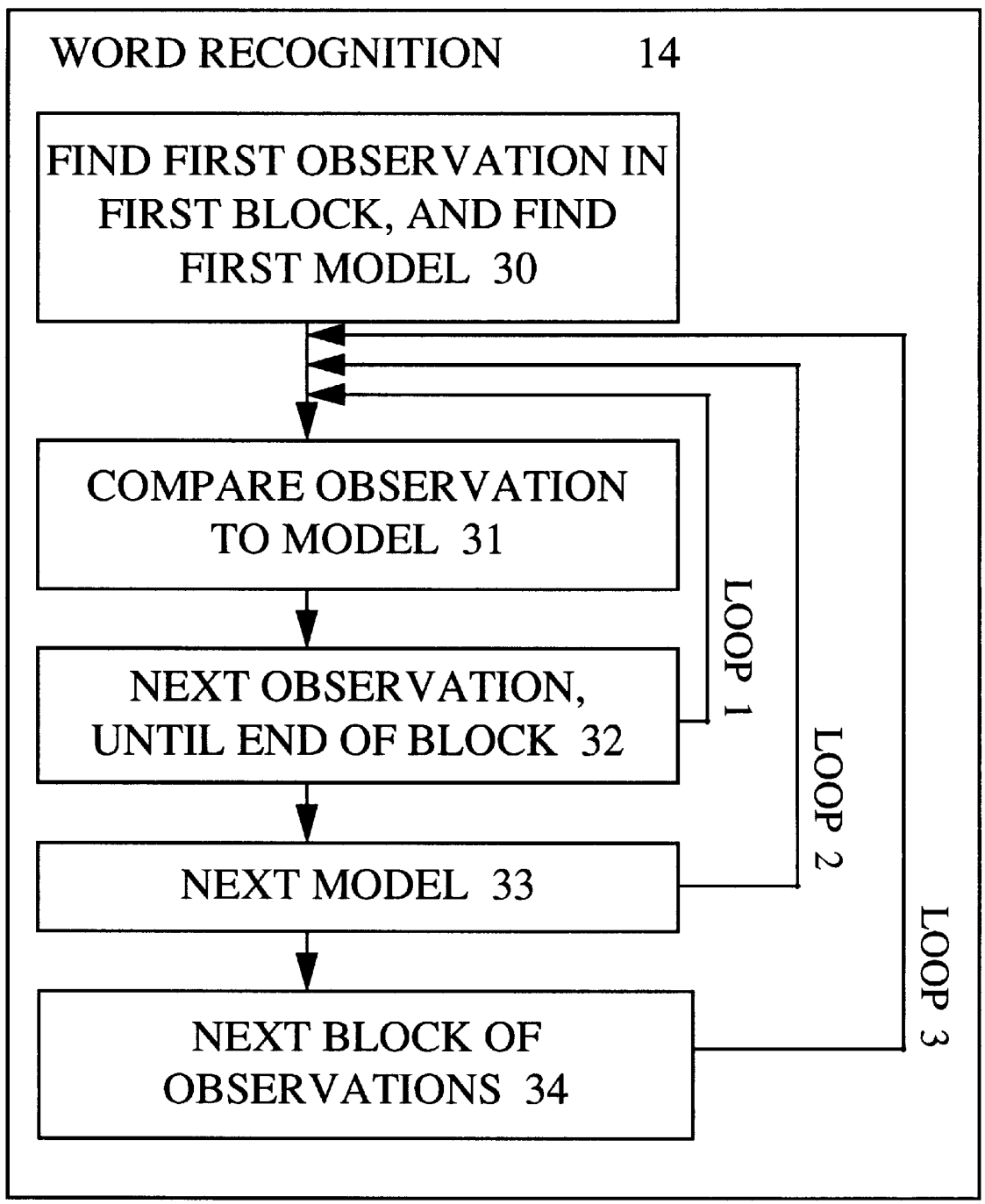
FIG. 5 shows the recognition step according to an embodiment of the invention.

FIG. 5, speech recognition steps according to an embodiment of the invention:

FIG. 5 shows features of an embodiment of the present invention. A word recognition method is illustrated, as could be used for example in the word recognition step 14 of FIG. 1. At 30, the first observation in the first block is input, ready for comparison with the first model. At 31, the observation is compared to the model. At 32, loop 1 is taken, to enable comparison of the next observation in the block, to the first model. Once all the observations in that block have been compared, and scores determined for the likelihood of a match, at 33, the next model is input and loop 2 is followed. All the observations in the same first block are then compared to this next model. This is repeated until all the models have been compared, and at 34, the whole process is repeated for the next block of observations, by taking loop 3.

Figure 6:
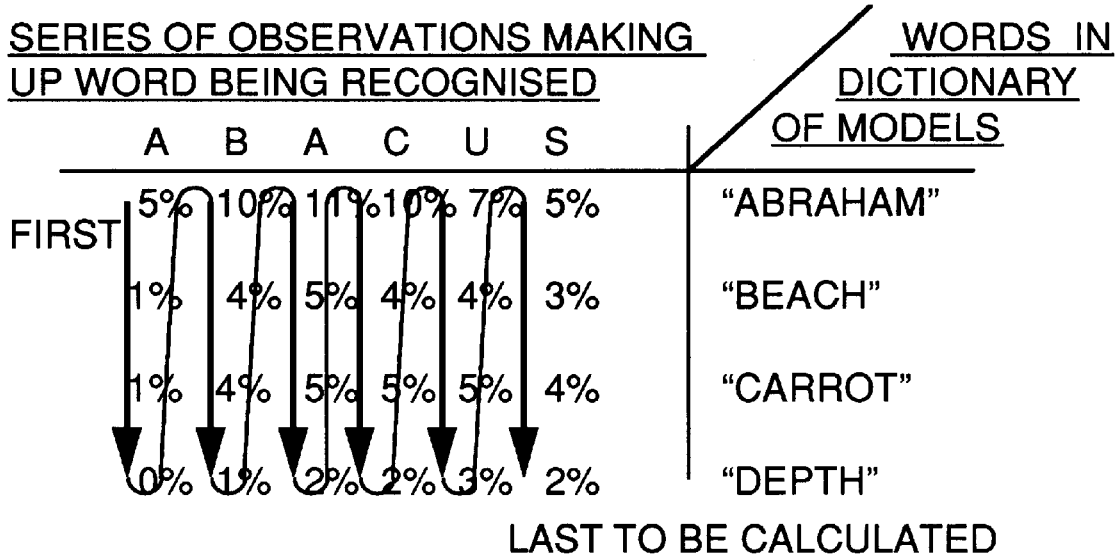
FIG. 6 shows a table of scores for a series of observations matched against models, indicating the known order of calculating the scores.
Figure 7:
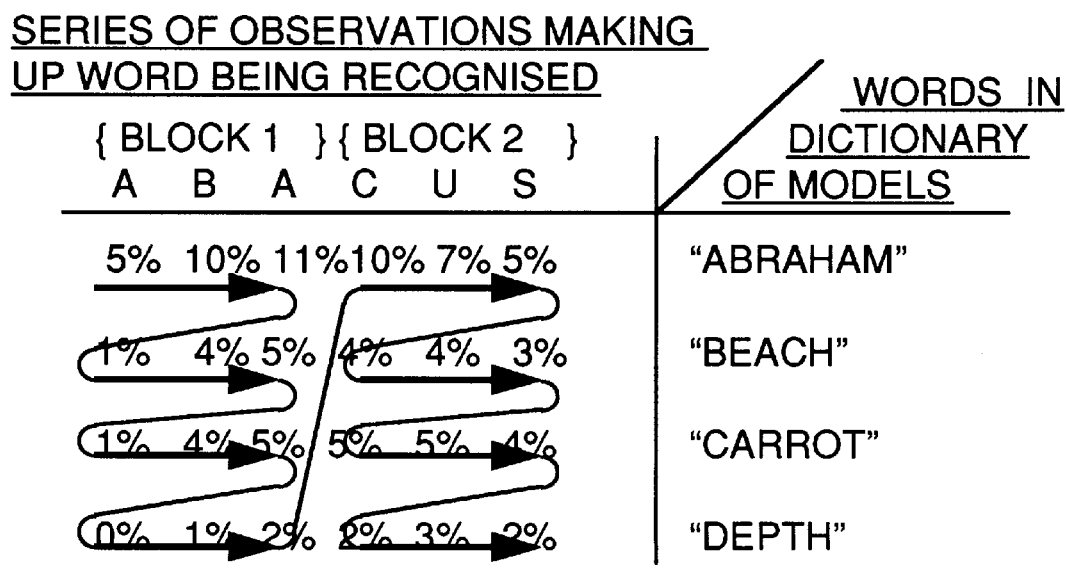
FIG. 7 shows the table of scores as shown in FIG. 6, indicating an order of calculating the scores according to an embodiment of the invention.

FIGS. 6, 7 table of scores indicating the order of calculating the scores:

The effect of the distinctions of FIG. 5 over the method illustrated in FIG. 4, will now be explained with reference to FIGS. 6 and 7. FIG. 6 shows a table of scores, in percentage terms, for each match between an observation and a model. Arrows through the percentage scores illustrate the order of calculating the scores. The actual percentage scores shown are not realistic figures, but merely examples for the purpose of illustrating the order of calculation.

For explanatory purposes, the series of observations making up the word being recognized are shown as individual letters, making up the word ABACUS. In practice, the observations are more likely to be much smaller fractions of the word, to enable reasonable accuracy. Only four models are shown, in practice there may be many more, and they may be smaller parts of speech than words, or they may be combinations of words. There is no need for them to be in alphabetical order or any other order. As can be seen, starting with the first observation "A", a score of 5% is shown for the match with the model word "ABRAHAM". Next, the comparison between the same observation "A", and the next model word "BEACH", is carried out, giving a score of 1%. Once all the models have been compared to the letter "A", the next observation "B" is compared to each of the word models in turn.

The process continues until all observations have been compared to all models. Once consequence of this known method is that where either the number of models is large, or where each model is large, it is less likely that the first model will still be in the cache when it is to be used a second time, for comparison with observation "B". Likewise, when the second model word "BEACH" is compared against the second observation, "B", the model is unlikely to be still in the cache. Accordingly, every model must be brought in from main memory each time it is used.

This means that for each iteration of loop 1 in FIG. 4, the model would need to be read in from global memory.

FIG. 7 shows the effect of the block algorithm shown in FIG. 5. The order of calculating the scores is changed so that a number of observations are compared to the same model in loop 1 of FIG. 5, before the next model is loaded, and the same observations are compared to the next model. Effectively, the order of processing has been altered by inverting the order of the loops. It enables global memory accesses to be executed only once per block per model, instead of once per observation per model, which can have a dramatic effect on the time of execution of the process. The size of the block is a parameter which can be varied according to requirements of the application. If the block size is too large, the processing delay may be too long because processing of the first model can only be completed when all the observations in the block have been input. Also, there are more calculations to be carried out after the last observation has been input, and therefore there may be a longer delay in finishing processing after the last utterance by the user. Another constraint affecting the size of the block is that it becomes more difficult as the blocks size increases, to provide intermediate scores to other stages of the overall speech recognition process.

Nevertheless, there may be an advantage in better use of storage space for passing scores forward for use in calculation of the comparison of the same word against the next observation. For the cases where the order of processing follows one of the horizontal arrows in FIG. 7, the calculation uses the result of the immediately preceding calculation. In such cases it may be possible to use a small area of faster memory, such as the cache, for storing the scores, since there are no intervening calculations. Thus the same portion of memory can be reused after each match. In FIG. 6 there are no such examples, and in every case, the preceding scores must be held for some time, with many intervening calculations of matches with different models.

before the first score is used to contribute to the calculation of the comparison of the next observation to the same model. Thus buffers cannot be reused in the manner described above.

Furthermore, the block size may need to be matched to the size of the cache. The cache should be large enough to store one model and at least one observation. Even if smaller than this, there may still be some advantage, if at least part of the model can be retained in the cache, and thus reduce the number of slower global memory accesses, even if the entire model cannot be held in the cache.

If the cache is large enough to hold one model and all of the observations in the block, an additional advantage is gained in that none of the observations need to be drawn from global memory for the duration of processing that block.

The speech recognition system described in more detail below is based on Flexible Vocabulary Recognition (FVR), which relies on phone-based sub-word models to perform speaker-independent recognition over the telephone. Most applications using this technology are currently based on isolated word recognition, with a limited word-spotting capability in some applications. Rejection is an integral component of the technology, since the system must detect both its own recognition errors and when the user has said something that it cannot understand, in order to provide reliable performance. The sub-word models use hidden Markov modelling.

Feature Extraction

The purpose of the signal processing component is to convert the utterance, which is a series of samples of speech, into a more compact series of feature vectors. Besides being more compact, the feature vectors provide better speech recognition performance since they tend to remove many speaker-dependent effects and improve the robustness of the system to noise. The feature vector currently consists of 15 elements, which are constructed from the mel-cepstral coefficients (refer to Deller et al.). The first seven elements of the feature vector, often referred to as the static parameters, are the cepstral coefficients $c_1, \ldots, c_7$. The remaining eight elements, often called the dynamic parameters, or delta cep, are $\delta c_0, \ldots, \delta c_7$, which are estimates of the first derivative of each cepstral coefficient.

There are three types of feature vector, or cep, in use. The first is standard cep, which is based on the usual mel-cep. The second, which is called equalized cep, uses a simple noise model to remove some of the effects of noise in the utterance. The last, called enhanced cep, uses cepstral mean subtraction to remove some of the channel-dependent effects. The calculation of the standard cep is taken from Sharp et al. (1992).

In standard cep, the observed speech signal (y(t)), sampled at $f_s$=8 kHz, is decomposed into overlapping frames of duration $N_w$=204 samples, and overlap $N_o$=102 samples. A power spectrum is computed for each frame, using a K=256 point FFT. Log-channel energies (LCE) are computed by passing the spectrum through a triangular filter bank. Finally, the energies are transformed into the mel-cepstrum (MEL-CEP). Each frame is represented by a 15-dimensional vector consisting of seven static MEL-CEP parameters, seven dynamic MEL-CEP parameters, and one dynamic energy parameter.

Flexible Vocabulary Recognition (FVR)

FVR attempts to produce a set of models for a new application or task without requiring task-specific training data for the models. Ideally, the application builder would provide a list of words to be recognized, hit "Return", and the FVR process would automatically construct a load, including the models to be used, lexicon, and the language model (in a continuous-speech application). Although having accoustic models which accurately model speech, even for novel tasks, is crucial for a successful system, FVR also relies on the ability to predict how people are going to pronounce words, based simply on the orthography. This, in itself, is a fairly daunting problem, for many reasons, including:

1. speaker variability—different speakers tend to pronounce words differently, depending on their background, and the environment.
2. different accents—the accent can vary widely, even in the same country (compare Newfoundland with Ontario, or Georgia with New York City).
3. non-English words—many proper names (such as locality and company names) do not originate from English, so that even native speakers may not be sure how they are pronounced.
4. non-native speakers—even humans may have difficulty understanding non-native speakers with strong accents.

Some of these problems have been dealt with, at least to some degree, even if only by collecting the appropriate training data. For others, such as strongly different accents, collecting some training data for the accent region to use as the basis for modelling may be the only solution.

Figure 8:
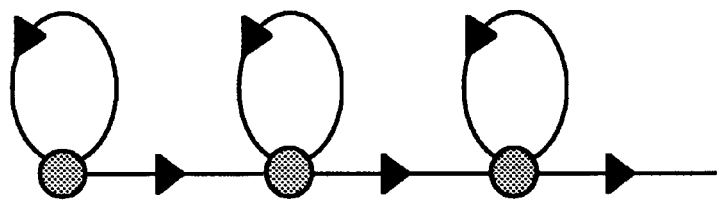
FIG. 8 shows a basic HMM topology.

FIG. 8, Accoustic Modelling, and a basic HMM topology:

The first step is to determine which allophones to use. Allophones are accoustic realisations of individual phonemes, in particular phonetic contexts, i.e. dependent on what comes before or after it. Having decided on a set of allophones to use, it is necessary to find models for each allophone that can be used to recognize utterances. The modelling paradigm used here is to construct models using hidden Markov models (HMMs) (see Deller et al. 1993, Rabiner 1989) (see FIG. 8). The HMMs for the allophones can be easily concatenated together to produce word models. Essentially, an HMM is a finite state machine, with probability distributions (pdfs) attached to it. A basic assumption of the HMM paradigm is that the random process modelled by each state is stationary for the duration of the state. In this way, speech, which is non-stationary, can be modelled as a series of piece-wise stationary segments.

The primary tool for training and testing models is a C++ program and library that allows many functions related to HMMs to be performed. In addition, if it is intended to be used as a research tool, it should be easy to modify, and support a very flexible set of model topologies, and arbitrary parameter tying.

HMMs are assumed to be transition based. That is, if the HMM is used to actually generate a random process, then observations are produced when a transition is traversed. In the transition-based topology, each transition leaving a state may have a different pdf to model it. A disadvantage of the transition-based approach is that the transitions from one state to another may tend to be less well trained, since fewer frames may be aligned to them than the self-loops. To avoid this problem, as well as to reduce the number of parameters, a state-based topology can be used, where the pdf is state-dependent, and all the transitions out of the state share the same pdf. This is achieved by tying together the pdfs of all the transitions leaving a state.

Each pdf is assumed to be a mixture of N-variate Gaussian distributions, where N is the dimensionality of the feature vector. Recall that the pdf of an N-variate Gaussian pdf has the form $$f(\underline{x}) = \frac{1}{(2\pi)^{N/2}\sqrt{|C|}} \exp\left[-\frac{1}{2}(\underline{x}-\underline{\mu}_i)^t C^{-1}(\underline{x}-\underline{\mu})\right], \quad \text{(EQ. 1)}$$

where x is the N-dimensional observation vector, $\mu$ is the mean vector, and C is the covariance matrix. A single Gaussian distribution is unimodal; that is, it has a single mean. To more accurately model speech, it is necessary to use multimodal distributions; that is, pdfs that have more than one mean. A multimodal Gaussian, or mixture distribution, is obtained by taking a weighted sum of unimodal pdfs; that is, $$f(\underline{x}) = \sum_{i=1}^{M} w_i f_i(\underline{x}) \quad \text{(EQ. 2)}$$

where $\Sigma_{wi}=1$, to ensure that the pdf integrates to 1, and $$f_i(\underline{x}) = \frac{1}{(2\pi)^{N/2}\sqrt{|C_i|}} \exp\left[-\frac{1}{2}(\underline{x}-\underline{\mu}_i)^t C_i^{-1}(\underline{x}-\underline{\mu}_i)\right] \quad \text{(EQ. 3)}$$

is the unimodal pdf of each mixture component. In theory, a Gaussian mixture distribution can match an arbitrary distribution, arbitrarily closely, if there are sufficient mixture components. In most cases, speech can be modelled with a fairly small number of mixture components (from 5 to 40, depending on the type of models and the application).

Exactly how many mixture components should be used is still an open problem. A larger number of mixture components will cover the acoustic space better, but if there are too many, it may be impossible to train them well, and the computation overhead may become too expensive. One way to overcome, at least to some degree, these two opposing constraints is to use the same mixture components in more than one mixture distribution. Such an approach is called tied-mixtures. There are many possible ways in which the mixture components may be tied. For example, as in the original tied-mixtures research, a large number of mixture components may be used, where each mixture distribution has the same underlying unimodal distributions, but the mixture weights are dependent on the state in which they occur. Another approach would be to constrain all the allophones of a phone to share the same mixture components, with allophone-dependent mixture weights.

To support such a wide variety of potential tyings, a flexible model structure should be provided (the price of such flexibility is that it is not always simple to set up the models, since a certain amount of careful book-keeping must be done). Briefly, the C++ program and library is constructed in terms of layers of pools, and each layer contains pointers to the layer below. At the bottom layer, there are rotations (the rotation is determined from the covariance matrix—see below). The next layer contains pdfs, which consist of a mean vector and a pointer to a rotation. Pdf_sets are collections of pointers to pdfs. A mixture contains a pointer to a pdf_set and a vector of mixture weights. The fenone, which is essentially a state in the HMM, contains pointers to several mixtures (one for each transition out of the fenone), a set of transition weights, and the destination state for each transition. The next higher layer is the state layer, which has pointers to fenones (usually, each state has one fenone associated with it). Finally, there is the model layer, which is a collection of states and represents the HMM, which itself typically models an allophone. This notion of pools clearly supports a wide variety of tyings, but it is also necessary to keep careful track of the pointers. Tools do exist that provide basic schemes with a minimum of effort on the user's part, but more sophisticated schemes require their own tools.

The Rotation Matrix

A rotation matrix is a covariance matrix that has been transformed to reduce the number of floating point multiplications. During training and recognition, it is necessary to make computations of the form $$(x-\mu_i)^t C_i^{-1}(x-\mu_i) \quad \text{(EQ. 4)}$$

for each mixture component in the model set (Equation 4 is referred to as a Mahalanobis distance). Exactly how these values are used is shown in Section 4.0. The problem with applying Equation 4 directly is that it contains a large number of redundant computations, particularly when the total number of rotations is reasonably small (which is usually the case). Using several tricks, it is possible to reduce the number of multiplications significantly.

The first trick involves decomposition of the inverse of the covariance matrix into a product of two matrices of the form $$C_i^{-1} = LL^t, \quad \text{(EQ. 5)}$$

where L is a lower triangular matrix (that is, all of its components above the main diagonal are zero). This decomposition, using the Cholesky algorithm, is possible because the covariance matrix is always positive definite (that is, all of its eigenvalues are positive). The Cholesky algorithm is simple, fast, and numerically stable.

Equation 4 can be rewritten as $$(x-\mu_i)^t LL^t(x-\mu_i) = (x^t L - \mu_i^t L)(L^t x - L^t \mu_i), \quad \text{(EQ. 6)}$$

and, observing that $Lx=y$ and $L\mu_i=z$, Equation 4 reduces to $$(x-\mu_i)^t C_i^{-1}(x-\mu_i) = y^t y - 2y^t z + z^t z, \quad \text{(EQ. 7)}$$

where z and $z^t z$ are precomputed. The y's are computed at each frame by multiplying the observation vector x by each rotation matrix L in the model set (this is where the assumption that the number of rotations matrices is relatively small comes into play).

Figure 9:
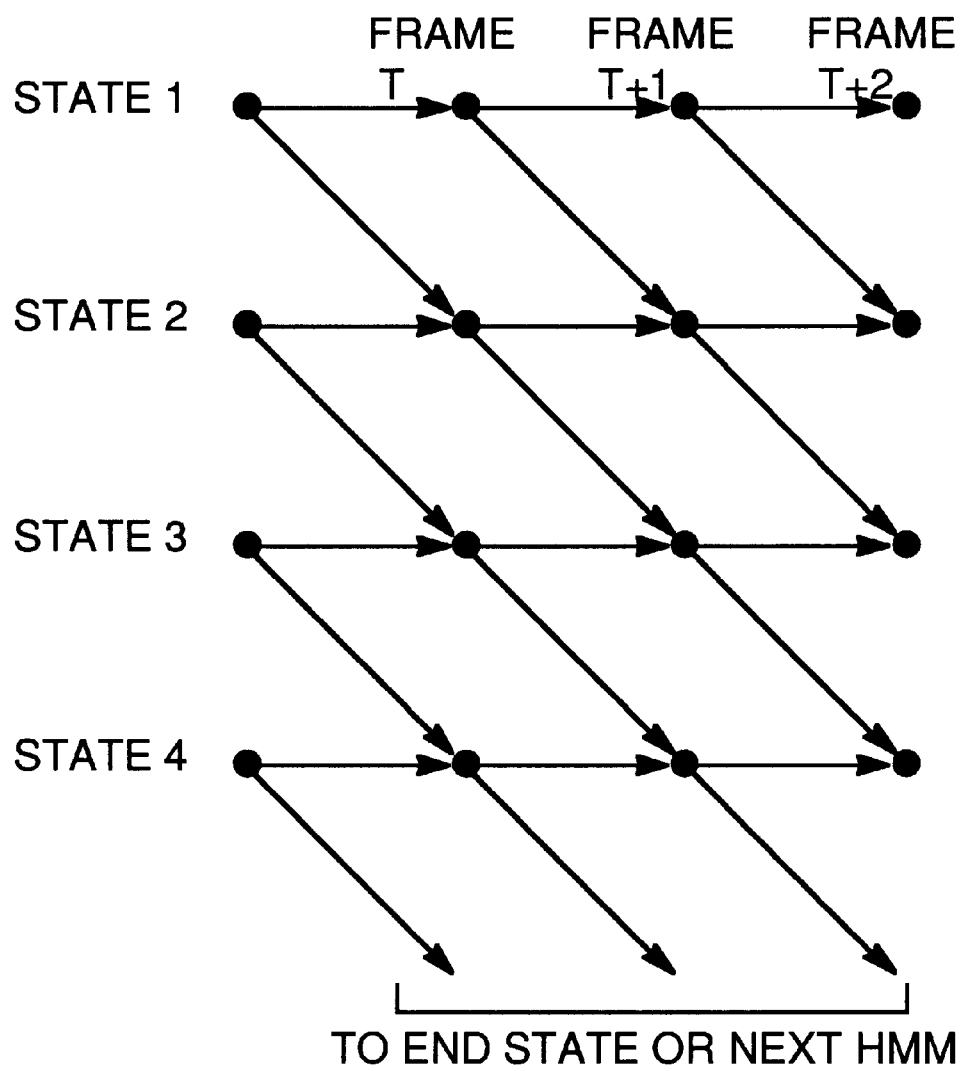
FIG. 9 shows a trellis of an HMM.
Figure 10:
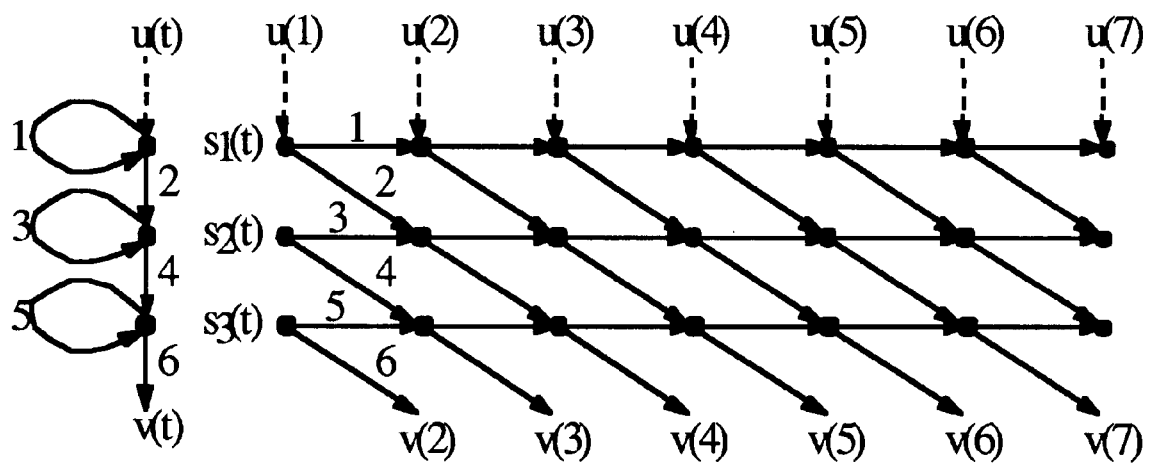
FIG. 10 shows a trellis for a block Viterbi search.

FIGS. 9,10 The Viterbi Algorithm, and a trellis of an HMM:

Given a set of HMMs, which will be assumed to be modelling allophones, a lexicon, and an utterance, it is necessary to determine the likelihood of the utterance matching an entry in the lexicon. This likelihood will be used to train the models and, during recognition, the lexical entry with the maximum likelihood will be the recognizer's choice for what the utterance is. The Viterbi algorithm is a dynamic programming algorithm originally applied to operations research, and since applied nearly everywhere else (refer to Rabiner 1989 for more details). Basically, the set of HMMs and the lexicon (for recognition) or transcription (for training) are transformed into a trellis. The Viterbi algorithm finds the most likely path through the trellis.

As an example of the Viterbi algorithm, consider an utterance, which consists of the series of observations, $O=\{o_1, o_2, \ldots, o_T\}$. The observations are the cepstral vectors determined by the feature extraction step. As well, to simplify the example, only a single HMM is considered. Recall that an HMM is represented by a series of states connected by transitions. The trellis is simply another representation of the HMM, where a copy of the states is placed at each time, and the transitions go from one state at time t to another state at time t+1 (see FIG. 9).

Finding the Best State Sequence

Basically, the Viterbi algorithm finds the state sequence, or path, through the trellis that best corresponds to the observation 0. For each state at each time, the likelihood of the best path arriving at that state at that time is maintained. To see how this is done, suppose that the algorithm has been applied up to time t−1. Let S(i, t) be the likelihood, or score, of the best path arriving at state i at time t. It is computed by finding $$S(i,t) = \max_j [p_{ji} S(j,t-1) P(o_t|j,i)], \quad (EQ. 8)$$

where $P(o_t|j,i)$ is the probability of the observation at time t, $o_t$, given the transition going from state j to state i, which is the likelihood defined by Equation 2, and $p_{ji}$ is the transition probability from state j to state i. The best state sequence is defined as the path that has the best score at time T, and usually ends in the terminal state of the HMM (by assumption).

Solving the Underflow Problem

A practical problem of directly applying Equation 8 is that the scores are likely to be extremely small numbers, and get smaller as T becomes larger. This results in serious numerical underflow problems. The simplest solution is to retain lnS(i,t) instead of S(i,t). This is very convenient for the computation of the likelihoods, since the exponentiation is no longer necessary. Therefore, Equation 3 becomes $$\ln f_i(x) = -\frac{N}{2}\ln 2\pi - \frac{1}{2}\ln|C_i| - \frac{1}{2}(x-\mu_i)^t C_i^{-1}(x-\mu_i) \quad (EQ. 9)$$

(where the products are computed using the rotations as in Equation 7).

The Viterbi Approximation for Mixture Distributions

Logarithms solve the underflow problem, but introduce a new problem, involving the calculation of the logarithm of a sum. Let J be the value of j that satisfies the max in Equation 8. Then, using logarithms, $$\ln S(i,t) = \ln S(J,t-1) + \ln P(o_t|J,i) + \ln p_{Ji} \quad (EQ. 10)$$

The problem is that, using Equation 2, $P(o_t|J,i) = \Sigma W_{J,m} f_{J,m}(o_t)$, since the observation densities are modelled by mixture distributions, but only $\ln f_{J,i}(o_t)$ is being computed. If there are only two terms, say $\ln p_1$ and $\ln p_2$, then the fastest and most numerically stable method of computing $\ln(p_1+p_2)$ is to use $$\ln[p_1+p_2] = \ln p_1 + \ln[1+e^{\ln p_2 - \ln p_1}] \quad (EQ. 11)$$

The trick used in Equation 11 is appropriate for the addition of two components, but the number of mixture components is generally much larger than two. To solve this problem, an approximation is used:

$$\ln P(J,i) \approx \max_m [\ln w_{J,m} + \ln f_{J,m}(o_t)] \quad (EQ. 12)$$

based on the observation that if the mean of each mixture component is sufficiently far from the others, then lnP(J,i) will be dominated by the mixture component which is nearest to $o_t$, since $o_t$ will be in the tails of the distributions of the other mixture components. This turns out to be the case most of the time. Effectively, this approximation converts a single transition from state J to state i, with probability $p_{Ji}$, and a mixture distribution, to M parallel transitions from J to i, each with a transition probability $p_{Ji} w_{J,m}$, and a unimodal distribution.

The Block Viterbi Algorithm

Consider the trellis shown in FIG. 10. As described above with reference to finding the best state sequence, the Viterbi algorithm finds, for each state, $$s_1(t) = \max[u(t), s_1(t-1) + b_1(t)]$$

$$s_2(t) = \max[s_1(t-1)+b_2(t), s_2(t-1)+b_3(t)]$$

$$s_3(t) = \max[s_2(t-1)+b_4(t), s_3(t-1)+b_5(t)]$$

$$v(t) = s_3(t-1) + b_6(t) \quad (EQ. 13)$$

where u(t) corresponds to the input scores to the HMM (the output scores of the previous HMM in the word model) between frames t and t+1, $b_1(t)$ is the score of transition I for frame t (determined as in Section 4.4), and v(t) is the score at the output of the ENM between frames t and t+1.

The usual implementation of the Viterbi algorithm (referred to as the frame-synchronous Viterbi algorithm) is:
for each frame t
   for each HMM m
      apply Equation 13.

In other words, frame t is processed for every transition of every model before frame t+1 is processed.

The block Viterbi algorithm processes frames in blocks, simply by changing the order of the loop:
for each block b
   for each HMM m
      for each frame t in the current block b
         apply Equation 13.

For each block, u is assumed to be available (for the inputs to the first HMMs, it is initialized appropriately, and for all other HMMs, the order of their processing ensures that it is available when it is required). Using u, the output scores for the HMM v are calculated for every frame of the block and passed to subsequent HMMs. At the beginning of the block, the trellis state values ( $s_1(t), s_2(t), s_3(t)$ ) are restored to the values they had at the end of the previous block. The vectors of scores, u and v, are called score buffers. The optimization of the block Viterbi algorithm is discussed further below.

The block size is typically 40. The advantage to the block version of the Viterbi algorithm is that it uses memory more efficiently, both in terms of speed of access and limiting the amount of memory required.

The Training Algorithm

Once the allophones have been chosen, models must be trained. There are several techniques that can be used to train models, all based on iterative approaches, where an initial estimate of the parameters of the models is progressively refined. Historically, the first method, referred to as the Baum-Welch algorithm, is a variant of the E-M algorithm (see Deller et al. 1993, Rabiner 1989). The method used here, which is less expensive in terms of computation than the Baum-Welch algorithm, is based on the Viterbi algorithm. Both of these methods are variants of maximum likelihood estimation (MLE), which means that they attempt to maximize the average likelihood of the training tokens, according to the model parameters. More recently, methods that attempt to maximize the discrimination between competing models have been considered, either by directly attempting to maximize the difference between the correct model and the other models, or by maximizing the mutual information (for example, see Normandin 1991).

Recognition

Recognition is also based on the Viterbi algorithm, but has a different set of challenges from training. Training of models is generally done off line, so that the constraints of speed and complexity are quite generous. For recognition, the constraints are much tighter, particularly for real applications. Applications use a Speech Recognition Processor (SRP), which uses six CPUs to perform the recognition. The SRP has only a finite amount of memory, which places constraints on the number of parameters (basically, the number of means and, to some degree, the number of models) in the model set. As well, the typical specification for processing delay is that the recognition must be "real-time plus half a second," which means that the recognition must be complete no more than half a second after the end of the utterance (ideally, the end of the utterance is where the person stops speaking).

As well as operating under strict constraints of memory and time, recognition must also be more robust than training. Typically, people using speech applications will make errors and say things that are not in the vocabulary of the recognizer. For real applications, it is necessary to detect these circumstances, as well as the cases where recognizer is itself in error. The process of detecting such conditions is called rejection.

The Basic Recognition Algorithm

As mentioned above, the recognition algorithm is based on the Viterbi algorithm. It consists of two steps. The first, called the fast-match, is, as its name implies, a first fast pass through the utterance, which returns several choices (typically on the order of 20 to 30) that are most likely to include what the person has said. The second step, called rescoring, performs a more expensive algorithm on each of the choices returned by the fast-match. The top choice after rescoring is what is returned by the recognizer as being what the person has said. As well, for rejection, it is necessary to have a second choice, to compare to the first. The idea of the second choice is that if it is too close to the first choice, then there is not enough confidence in the recognition result, and it should be rejected.

Lexical Graphs

Typically, the recognition vocabulary, or lexicon, is a list of words or phrases, each of which has one or more transcriptions. Although the current technology is based on isolated word recognition, people often do not say the word or phrase in isolation. For example, for a directory assistance task, where the first step is to recognize the locality name, the person may not be sure of the locality, and so may say "Ah, Ottawa", or "Ah, Denver", instead of simply "Ottawa" or "Denver". As well, people also have a tendency to be polite, even to machines, so that they may say "Denver, please". To handle these cases, a limited word-spotting approach is used. An utterance is assumed to consist of an optional prefix, a core, and an optional suffix. The core is basically the desired recognition vocabulary (for the locality recognition, it would be one of the list of localities in the lexicon). Often, most of the utterances in an application can be modelled in this way, using a relatively small number of prefix and suffix entries.

To reduce the complexity of the recognition task, each part of the lexicon is specified by a graph. For example, the supported prefixes might be Ah Ah, For For It's in Ah, in Ah, it's in There is a large amount of overlap between the entries, and merging them into a lexical graph will result in a smaller task.

Each branch on a lexical graph represents a sequence of one or more models, which means that each branch also has a trellis, formed by the states of each model on the branch. Therefore, the lexical graph has a large trellis, which is constructed by connecting the trellises for each branch together.

Figure 11:
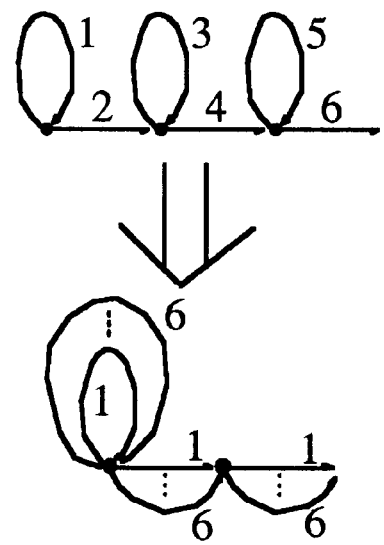
FIG. 11 shows how full models are collapsed to become fast-match models.
Figure 12:
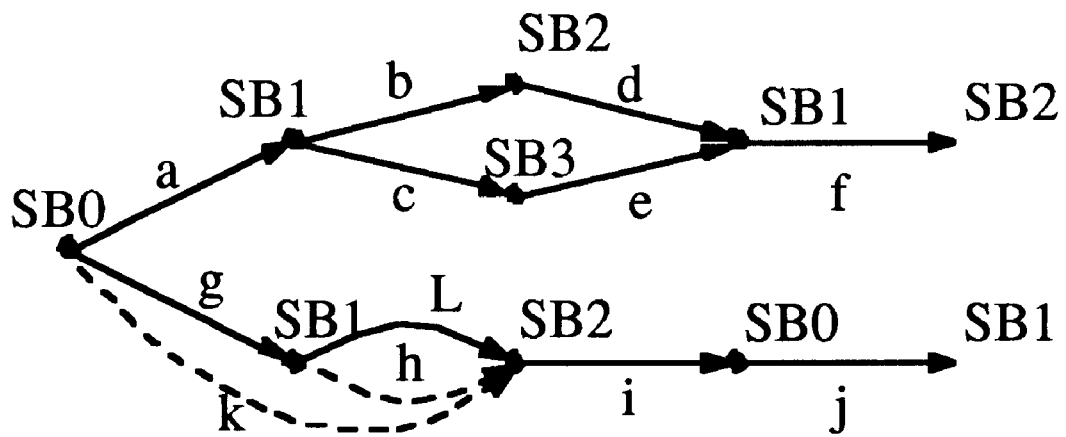
FIG. 12 shows a block Viterbi lexical graph, showing branch types and score buffer assignment.
Figure 13:
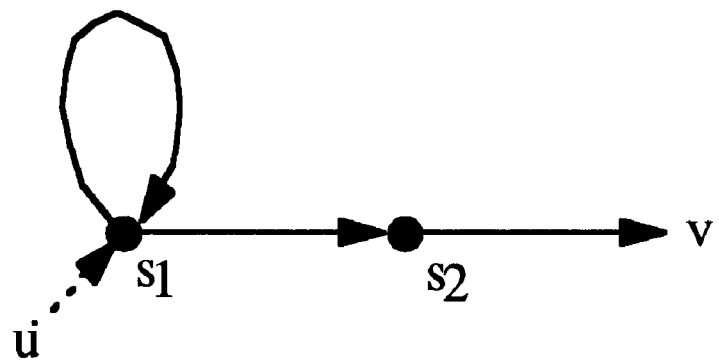
FIG. 13 shows a fast match model.

FIGS. 11, 12, 13, The Fast-Match (first pass)

Given a lexical graph and the corresponding trellis, the Viterbi algorithm can be used to determine the score of each leaf in the lexical graph. However, this will take too long. If the number of states in the trellis can be substantially reduced, then the Viterbi search may be fast enough. To achieve a reduction in the number of states in the trellis, the fast-match collapses all the states of each model into a single state, making each transition in the model a self-loop of the single state. As well, a minimum two-frame duration is imposed (see FIG. 11). At each frame, the observation vector is aligned to the nearest mixture component of all the mixture components in the model. The price of this reduction is a loss in temporal constraints, which means that mixture components in the last state of the model may appear before those in the first state. In practice, this effect is usually not very strong, since the Mahalanobis distance dominates the likelihood of the path.

During the fast-match, the Viterbi algorithm is applied to the reduced trellis, to produce a score for each leaf of the lexical graph. A list of the top M scores is compiled, and passed to the rescoring algorithm. The measure of the performance of the fast-match is the fast-match inclusion rate. The job of the fast-match is to have the correct choice appear somewhere in its list of the top M fast-match choices. Typically, the fast-match inclusion rate is very high—well over 90% (this is application/vocabulary dependent—for many applications, the top 30 choices include the correct choice 99% of the time).

The blocked fast match algorithm is similar to the non-blocked version. In the non-blocked version, the two state scores, $s_1$ and $s_2$, are initialized to $u_1$ and $-\infty$, respectively. For the first block of frames, they have the same initialization. At the end of the block, $s_1$ and $s_2$ are remembered. At the beginning of the second block, and are initialized to the values they had at the end of the first block.

For the blocked fast match, it is necessary to store two floats (the values of $S_1$ and $s_2$) for each branch of the graph. These values can be stored in global memory, requiring $2N_{branches}$ floats in global memory. The local memory that is required is now $(B+1)N_{buffers}+2$. Since $B<<T$ (which is the number of frames) typically (utterances of several hundred frames are common), there is a substantial reduction in the amount of local memory that is required. This array of floats is referred to as the trellis since it stores the current values of the trellis state scores used by the Viterbi search.

Optimization of the Block Fast-Match Algorithm

The block Viterbi algorithm has been optimized in several ways to make it as fast as possible and to reduce the amount of memory it requires.

The first optimization is to minimize the number of score buffers that are required. Consider the lexical graph in FIG. 12, where each branch consists of a single allophone model. The nodes of the graph correspond to the inputs and outputs of the HMMs shown in FIG. 10; that is, the input node of branch corresponds to the score buffer and the output node corresponds to v. Since there are 10 nodes in the graph, we need at least 10 score buffers. However, not all of them are required at the same time, so that the actual number that is required is much less than 10. For example, in FIG. 12, the initial score buffer is score buffer SB0. It is used to determine the scores for score buffer SB1. Score buffer SB1 is used to determine the scores for score buffers SB2 and SB3. Once SB2 and SB3 have been determined, the scores in score buffer SB1 are no longer required so that score buffer SB1 can be reused to hold the scores at the outputs of branches d and e. Thus, only 4 score buffers are actually required.

The number of score buffers that are required for a given vocabulary depends on the vocabulary and the models. For several thousand branches, the number of score buffers is typically around 20–30.

Optimisation by approximation to reduce the number of floats

The next optimisation reduces the number of floating point calculations that are required. Consider the fast match model shown in FIG. 13. For a fast match model, Equation 13 becomes $$v_{t+1} = s_2 + d_1$$
$$s_2 = s_1 + d_1$$
$$s_1 = \max[u_{t+1}, s_1 + d_1] \quad \text{(EQ. 14)}$$

where each transition has the same distance $d_1$ because of the fast match approximation.

In Equation 14, there are two floats for each branch of the graph. It is possible to reduce this to one float per branch. To see how, it is convenient to re-write Equation 14 to explicitly show the time indices of $s_1$ and $s_2$:

$$v_{t+1} = s_2(t) + d_1 \quad \text{(EQ. 15)}$$
$$s_2(t+1) = s_1(t) + d_1 \quad \text{(EQ. 16)}$$
$$s_1(t+1) = \max[u_{t+1}, s_1(t) + d_1] \quad \text{(EQ. 17)}$$

First, Equation 17 can be re-written as $$s_1(t+1) = \max[u_{t+1}, s_2(t+1)] \quad \text{(EQ. 18)}$$

By shifting the time index, Equation 18 is equivalent to $$s_1(t) = \max[u_t, s_2(t)] \quad \text{(EQ. 19)}$$

Interchanging Equation 16 and Equation 17, and substituting Equation 19 for Equation 17, we have $$v_{t+1} = s_2(t) + d(t)$$
$$s_1(t) = \max[u_t, s_2(t)]$$
$$s_2(t+1) = s_1(t) + d(t) \quad \text{(EQ. 20)}$$

Finally, we can re-write Equation 20 in terms of a single float. With the initial conditions $s = -\infty$ and $v_1 = -\infty$, $$v_{t+1} = s + d(t) \ [s = s_2(t)]$$
$$s = \max[u_t, s] \ [s(LHS) = s_1(t)]$$
$$s = s + d(t) \ [s(LHS) = s_2(t+1)] \quad \text{(EQ. 21)}$$

for t=1, . . . , T, and LHS refers to the value of s on the left-hand side of the assignment.

For the blocked version, s is initialized to the value it had at the end of the previous block.

By converting Equation 14 to Equation 21, it is only necessary to store one float per graph branch. In other words, Equation 21 requires half the global memory that Equation 14 requires.

This simplification is optimal for when there is just one block. If there is more than one block (the usual case), this simplification is slightly suboptimal. If the optimal path crosses an HMM boundary exactly at the block end, the path will be lost. However, the effect of this is usually minimal since the next best path that crosses the HMM boundary one frame earlier or later (thus avoiding the HMM boundary at the block end) will have almost the same score.

Figure 15:
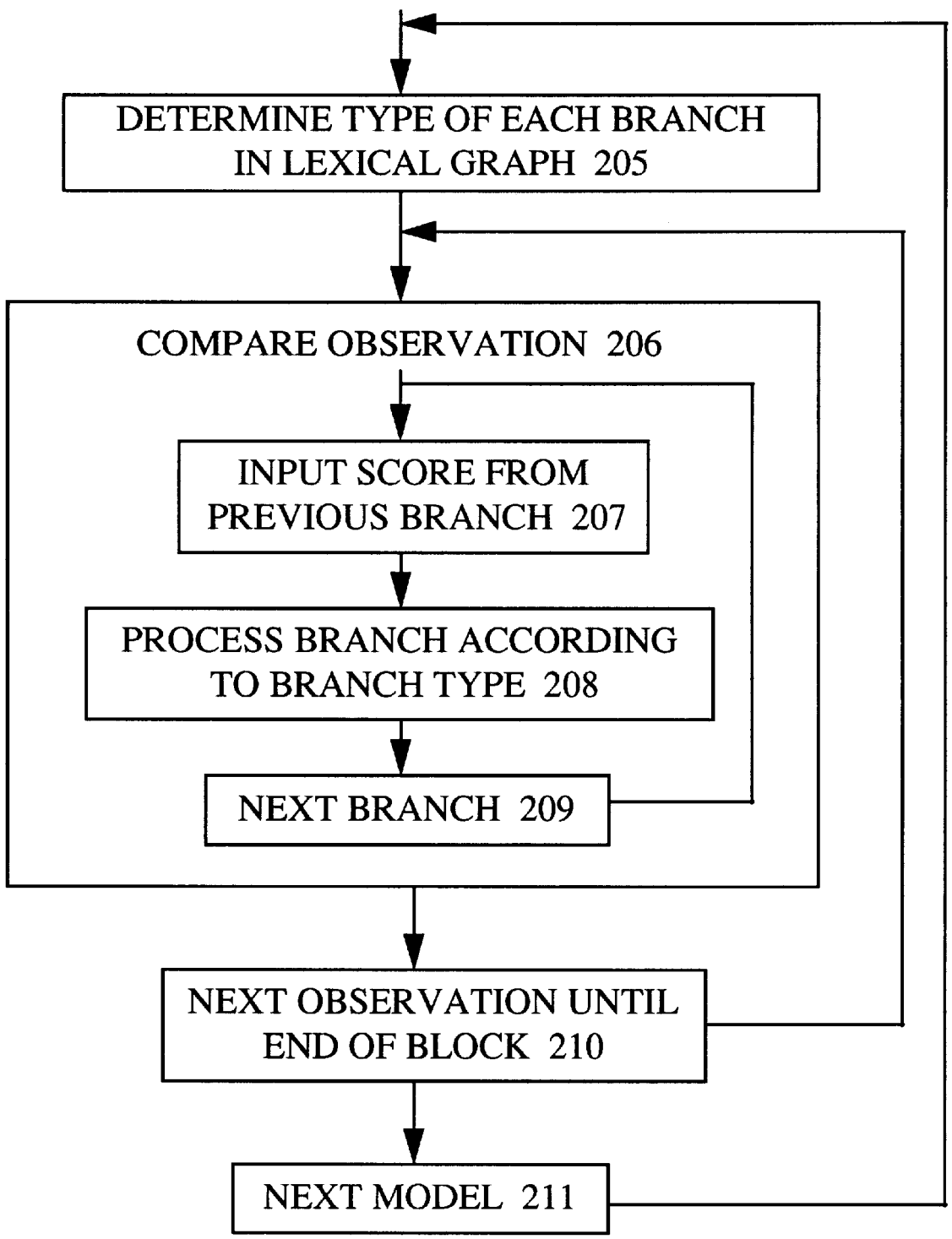
FIG. 15 shows the recognition step of FIG. 1 adapted for branch type optimization.

FIG. 15 Optimisation by predetermining branch type

The final optimisation is the use of multiple branch types, each with a slightly different algorithm for determining the output score buffers. As shown in FIG. 15, according to the branch type optimization, the type of branch processing to be used for each branch in a lexical graph comprising multiple branches is determined at 205, for a given block. At 206, the observations are compared. At 210, the process loops back for each observation in turn, until the end of the block. At 211 the process loops around again for each model. Within the comparison step, the current observation is compared by inputting a score from a previous comparison at 207, then calculating the new score at 208, using an algorithm appropriate to the type of branch. These steps are repeated for the current states on each of the various branches, and the new state scores are stored for use in matching the next observation.

Note that the type of branch is selected once per block. It is not necessary to check for each observation how the buffers should be updated. Also note that the selection of the branch type (which can be done with a case statement) is performed so that the test for a normal branch is done first. This is because the normal branch is the most common type.

Because it is not necessary to test for the branch type during the branch processing, the algorithm becomes simpler, particularly for the normal branch type. This simplification makes it easier for the compiler to pipeline the algorithm. This also contributes significantly to the increase in speed by using the block algorithm.

The block Viterbi algorithm has been described for a typical HMM topology. Other topologies or approximations (such as the fast match) may permit even more simplification, allowing even faster pipelining.

The different branch types

There are four basic branch types in the block Viterbi algorithm. Each requires a slightly different method of calculating scores. As well, each of the basic types, except the terminal type, has an update version, for a total of seven branch types. he branch types are (with reference to FIG. 12):

1) normal. This is the most common type. Branches a, b, c, d, f, g, i, and j are normal branches. Equation 14 is for normal branches (the most common branch type).

2) normal update. This corresponds to a normal branch whose output score buffer has already had scores put in it from another branch. Branch e is a normal update branch. The "update" means that it is a normal branch but that scores have already been written into the output buffer from the calculation of another branch (in this case, branch d). Instead of just setting the values in v (the output buffer for branch e), the exit scores of branch e are only put in v if they are larger than the values already there (since the Viterbi algorithm is trying to find the score of the path with the maximum score).

Figures 16, 17:
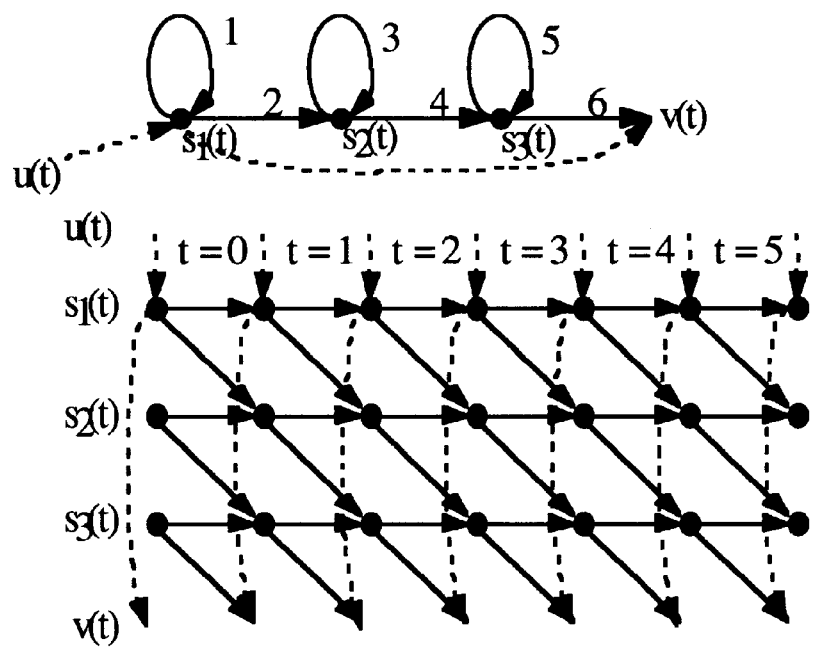
FIG. 16 shows an optional HMM and trellis.
FIG. 17 shows pseudo code for a block Viterbi algorithm for optional branches.

3) optional. An optional branch is the combination of a single normal branch and a null branch, where both branches have the same input node and the same output node. Branch h is an optional branch. An optional model (typically one of the silence models) is a model that may be deleted. Thus, there is null branch that is parallel to the branch containing the model. This could be implemented as a normal branch for the model and a null update branch, but it is faster to combine the two operations into a single branch type. FIG. 16 shows an optional HMM and trellis. The dotted path shows how the score of u(t) can be copied to v(t) if the path via the null branch has a better score.

4) optional update. An optional update branch is an optional branch whose output score buffer is already in use.

5) null. A null branch corresponds to a null branch in the lexical graph that bypasses more than one branch.

6) null update. A null update branch is a null branch whose output score buffer is already in use. Branch k is a null update branch—a null branch is associated with no frames so that its input buffer scores are copied directly into the output buffer. If the branch is a null update branch, the input buffer score is only copied to the output buffer score if it is greater than the value already in the output buffer.

7) terminal. A terminal branch corresponds to a leaf node of the lexical graph and indicates that the scores should be recorded to determine the final choices. Branches f are j terminal branches.

When implemented, the data structure for each branch contains the index of its input buffer, the index of its output buffer, and its type. If the branch is a terminal branch, it also contains the index of the leaf in the lexical graph to which it corresponds. Otherwise, the branch contains the index of the HMM model associated with the branch.

The branches are processed in the order of their index. The methods for each branch are described below. The block fast match algorithm loops over a branch list for each block. The branch list consists of a list of 32 bit words, 1 word for each branch. The 32 bit word is packed to contain the branch type, the index of the input buffer for the branch, the index of the output buffer, a flag that indicates if the input buffer may be freed, and the index of the model on the branch (or the index of the orthography corresponding to the lexical graph leaf if it is a terminal branch).

Normal branch processing

The normal branch processing uses equation 13, as follows:

1. Restore scores from global memory
2. $s_1=\max[s_1,u(0)]$
3. for $t=0,1,\ldots,B-1$
4. $v(t+1)=s_3+b_6(t)$
5. $s_3=\max[s_2+b_4(t), s_3+b_5(t)]$
6. $s_2=\max[s_1+b_2(t), s_2+b_3(t)]$
7. $s_1=\max[u(t+1), s_1+b_1(t)]$ Note that the state scores are updated beginning at the last state and going backwards so that the update can be done in place (otherwise it would be necessary to have two copies of the state scores, one for just before the observation and one for just after). As before, we assume each block contains B observations. Note that lines 5 through 7 could be implemented in a loop—the loop has been omitted for clarity. Finally, there may be fewer than B observations in the last block of the utterance, but this does not change the basic principle.

Normal update branch processing

The normal update branch algorithm is identical to normal branch processing except that line 4 is replaced by:

4. $v(t+1)=\max[v(t+1),s_3+b_6(t)]$

The additional max is necessary because the output of the branch (the output of the HMM) only replaces the score already there if it is the score of a better path.

FIGS. 16,17 Optional branch processing

An optional branch is a combination of a normal branch and a null branch (see FIG. 16). The null branch has the effect of copying the score of u(t) to v(t) if the path via the null branch has a better score, as shown by the dotted line of FIG. 16. The algorithm is shown in FIG. 17.

Optional update branch processing

An optional update branch is similar to an optional branch, except that scores are only written to if they are larger than the score already there. Thus, line 3 of FIG. 11 becomes:

3. $v(0)=\max[v(0),u(0)]$ and line 5 becomes:

5. $v(t+1)=\max[v(t+1),u(t+1),s_3+b_6(t)]$

Null branch processing

A null branch is just a straight copy of the input buffer to the output buffer. The algorithm is:

1. for $t=0,1,\ldots B$ {
2. $v(t)=u(t)$
3. }

Null update branch processing

As with the other update branches, the copy becomes a max:

1. for $t=0,1,\ldots B$ {
2. $v(t)=\max[u(t),v(t)]$
3. }

FIG. 14, pseudo code for the block Viterbi algorithm:

The complete block Viterbi algorithm is shown in FIG. 14. It is assumed that the lexical graph to be scored has a single root node with input scores specified in the vector.

The code shown is repeated for each block in the utterance. At line 7, the scores at the leaf corresponding to terminal branch are stored for later use (such as determining the leaf with the best score at each point, or feeding into the root of another lexical graph). At line 22, inp is freed. Note that this does not imply that inp is no longer being used as an input buffer and will be reallocated. This simply ensures that the next time inp is used as an output buffer, it will not be marked in use so the branch will not be marked as an update type.

At line 18, the branches are actually processed, using the algorithm tuned for each branch's type. The algorithms are all variations of the algorithm for normal branch processing, where u(t) is the input buffer and v(t) is the output buffer.

Rescoring

At present, the rescoring algorithm is simply the application of the Viterbi algorithm to each of the choices returned by the fast-match, using the original models. The cost of this second pass is reduced because all of the distances were computed during the fast-match pass and are generally saved, so that they do not need to be computed again during rescoring. Rescoring is actually quite similar to training. As well, rescoring also extracts more detailed information about the recognition that is used during rejection.

The use of more than one rescoring pass is being explored, where the top few choices after the first rescoring pass are rescored again using different features (for example, the fast-match and rescoring pass might use standard cep as the features, and equalized cep during the second rescoring pass). This is often helpful, since models based on different features tend to make different types of errors. However, there are limitations to how complex the rescoring can become, if it must be completed during the half second after the end of the utterance where the complete recognition is to satisfy the real-time plus half second constraint.

Figure 18:
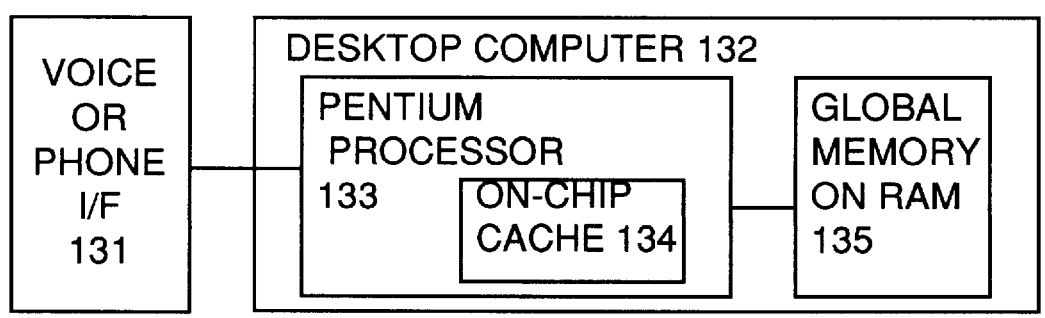
FIG. 18 shows an alternative recognition processor arrangement for carrying out some of the steps of FIG. 1.

Other Variations:

FIG. 18, alternative recognition processor arrangement

FIG. 18 shows an alternative hardware configuration for carrying out the steps of FIG. 5. A desktop computer 132 is connected directly to a voice input such as a microphone or an interface to a telephone line as illustrated at 131. The desktop computer includes a Pentium processor 133 which includes an on-chip cache 134. The cache may include fast memory provided external to the processor. Global memory would be provided by RAM 135. Such an arrangement could be used to carry out some or all of the steps shown in FIG. 1. Clearly, the computer could be linked to other computers to share the tasks, and perhaps speed the processing.

Sequence of observations

Although the examples described above indicate determining scores for a given model by processing observations in the order of their time sequence, it is possible to conceive of examples or algorithms where this is not essential. For example, scores may be built up for every second observation, in their respective time sequence, then subsequently, scores could be built up for the remaining observations. Furthermore, if the models were built up to represent speech recorded backwards, or in some other distorted time sequence, it might be appropriate to process observations in reverse time sequence, or a correspondingly distorted time sequence. Also, pattern matching algorithms can be conceived which do not build accumulated scores according to any time sequence. Accordingly the invention is not limited to processing the observations in a manner dependent on the time sequence of the observations.

Not all observations in block

Although in the examples described above, all the observations in a block have been compared to the given model before moving on to the next model, the invention is not intended to be limited to comparing all observations. Clearly, the advantage of reducing memory accesses will apply as soon as more than one observation is compared to the same model, before moving on to the next model.

Subset having multiple models

Although in the examples described above, all the observations in a block have been compared to a single model before moving on to the next model, the advantage of reducing memory accesses can apply even if each observation is matched to a subset comprising multiple models, as long as the cache is not filled up to overflowing, by this subset of multiple models. Even if it overflows, there remains some advantage, as long as some of the cache memory is not overwritten by the overflow. This could conceivably be achieved by limiting the size of the subset to less than the size of the cache, or less than twice the size of the cache, if the reduced advantage is acceptable.

Part of Cache Overwritten

Alternatively, the cache could be controlled so that for a given subset, a proportion of the cache is never overwritten, while the remainder of the cache may be overwritten, and may be overwritten several times. Thus a first model could be held in the cache, while second and third models are compared to the observations in the block. Even if the third model overwrites the second model in the cache, the number of cache misses can be reduced if the first model is not overwritten. Cache misses for the second model can also be reduced if all the observations in the block are matched to the second model before moving to the third model.

Other fields of Application

Although the invention has been described with reference to speech processing, it may prove advantageous in other unrelated fields of application. For example, complex pattern matching may occur in image processing, or ultrasonic imaging applications, where complex models may be used, with a computationally intensive matching algorithm.

Other variations will be apparent to persons of average skill in the art, within the scope of the claims, and are not intended to be excluded.

What is claimed is:

1. A computer implemented method of comparing a series of observations representing unknown speech, to stored models representing known speech, the series of observations being divided into at least two blocks each comprising two or more of the observations, the method comprising the steps of:

a) comparing two or more of the observations in one of the blocks of observations representing unknown speech, to a subset comprising one or more of the models representing known speech, to determine a likelihood of a match to each of the one or more models;

b) repeating step a) for models other than those in the subset; and c) repeating steps a) and b) for a different one of the blocks, and thereby recognizing the unknown speech in terms of the known speech.

2. The method of claim 1 wherein the observations are represented as multidimensional vectors, for the comparison at step a).

3. The method of claim 1 wherein the comparison at step a) uses a Viterbi algorithm.

4. The method of claim 1 wherein the models are represented as finite state machines with probability distribution functions attached.

5. The method of claim 1 wherein the models comprise groups of representations of phonemes.

6. The method of claim 1 wherein the models comprise representations of elements of speech, and step a) comprises the step of:

comparing the block of observations to a predetermined sequence of the models in the subset.

7. The method of claim 1 wherein step a) comprises the steps of:

comparing the block of observations to a predetermined sequence of the models in the subset;

determining for each of the models in the sequence, a score which represents the likelihood of a match with the observations compared so far;

storing the score in a score buffer for use in determining scores of subsequent models in the sequence; and determining when the score is no longer needed, then re-using the score buffer to store a subsequent score.

8. The method of claim 1 wherein, step a) comprises the step of:

comparing the block of observations to a lexical graph comprising a predetermined sequence of the models in the subset, wherein the sequence comprises different types of models, and the comparison is dependent on the type; and the method comprises the step of:

determining the types of the models before the block is compared.

9. The method of claim 1, the models comprising finite state machines, having multiple state sequences, wherein step a) comprises the steps of:

determining state scores for the matches between each respective observation and state sequences of the respective model, making an approximation of the state scores, for the observation, for storing to use in matching subsequent observations, the approximation comprising fewer state scores than were determined for the respective observation.

10. A computer implemented method of recognising patterns in a series of observations representing unknown speech, by comparing the observations to stored models representing known speech, using a processing system having a main memory for storing the models and a cache memory, the cache memory being too small to contain all the models and observations, the series of observations being divided into blocks of at least two observations, the method comprising the steps of:

a) using the processor to compare a subset of the models representing known speech to the observations, representing unknown speech, in one of the blocks of observations, to recognise the patterns, the subset of the models being small enough to fit in the cache memory;

b) repeating step a) for a different subset of the modelsi and c) repeating steps a) and b) for a different one of the blocks, and thereby recognizing the unknown speech in terms of the known speech.

11. A computer implemented method of recognising patterns in a series of observations representing unknown speech by comparing the observations to stored models representing known speech, the series of observations being divided into at least two blocks each comprising two or more of the observations, the models comprising finite state machines, having multiple state sequences, the method comprising the steps of:

a) comparing two or more of the observations, representing unknown speech, in one of the blocks of observations, representing known speech, to a subset comprising one or more of the models, to determine a likelihood of a match to each of the one or more models, by determining which of the state sequences of the respective model is the closest match, and how close is the match;

b) repeating step a) for models other than those in the subset; and c) repeating steps a) and b) for a different one of the blocks, and thereby recognizing the unknown speech in terms of the known speech.

12. The method of claim 11 wherein the observations are speech signals, and the models are representations of elements of speech.

13. The method of claim 11 wherein the comparison at step a) uses the Viterbi algorithm.

14. The method of claim 11 wherein the models are represented as finite state machines with probability distribution functions attached.

15. A computer implemented method of comparing a series of observations representing unknown speech, to stored models representing known speech, by comparing the observations to stored models, the series of observations being grouped into one or more blocks each comprising two or more of the observations, the models comprising finite state machines, having multiple state sequences, the method comprising, for each of the one or more blocks, the steps of:

a) comparing two or more of the observations, representing unknown speech, in the respective block, to a subset comprising one or more of the models, representing known speech, to determine a likelihood of a match to each of the one or more models, by determining which of the state sequences of the respective model is the closest match, and how close is the match; and b) repeating step a) for models other than those in the subset, and thereby recognize the unknown speech in terms of the known speech.

16. Software stored on a computer readable medium for comparing a series of observations representing unknown speech, to stored models representing known speech, the series of observations being divided into at least two blocks each comprising two or more of the observations, the software being programmed for carrying out the steps of:

a) comparing two or more of the observations, representing unknown speech, in one of the blocks of observations, representing known speech, to a subset comprising one or more of the models, to determine a likelihood of a match to each of the one or more models;

b) repeating step a) for models other than those in the subset; and c) repeating steps a) and b) for a different one of the blocks, and thereby recognizing the unknown speech in terms of the known speech.

17. Software stored on a computer readable medium for recognising patterns in a series of observations, representing unknown speech, by comparing the observations to stored models, representing known speech, the series of observations being divided into at least two blocks each comprising two or more of the observations, the models comprising finite state machines, having multiple state sequences, the software being programmed to carry out the steps of:

a) comparing two or more of the observations, representing unknown speech, in one of the blocks of observations, to a subset comprising one or more of the models, representing known speech, to determine a likelihood of a match to each of the one or more models, by determining which of the state sequences of the respective model is the closest match, and how close is the match;

b) repeating step a) for models other than those in the subset; and c) repeating steps a) and b) for a different one of the blocks, and thereby recognizing the unknown speech in terms of the known speech.

18. Software stored on a computer readable medium for comparing a series of observations representing unknown speech, to stored models representing known speech, by comparing the observations to stored models, the series of observations being grouped into one or more blocks each comprising two or more of the observations, the models comprising finite state machines, having multiple state sequences, the software being programmed to carry out for each of the one or more blocks, the steps of:

a) comparing two or more of the observations, representing unknown speech, in the respective block, to a subset comprising one or more of the models, representing known speech, to determine a likelihood of a match to each of the one or more models, by determining which of the state sequences of the respective model is the closest match, and how close is the match; and b) repeating step a) for models other than those in the subset, and thereby recognizing the unknown speech in terms of the known speech.

19. A speech recognition processor for comparing a series of observations representing unknown speech, to stored models representing known speech, the series of observations being divided into at least two blocks each comprising two or more of the observations, the processor comprising:

a) first means for comparing two or more of the observations, representing unknown speech, in one of the blocks of observations, to a subset comprising one or more of the models, representing known speech, to determine a likelihood of a match to each of the one or more models; and b) second means for comparing the two or more observations to models other than those in the subset; and wherein said first means and said second means iteratively compare the series of observations to the stored models to thereby recognize the unknown speech in terms of the known speech.

20. A speech recognition processor for recognising patterns in a series of observations by comparing the observations to stored models, the series of observations being divided into at least two blocks each comprising two or more of the observations, the models comprising finite state machines, having multiple state sequences, the processor comprising:

a) first means for comparing two or more of the observations, representing unknown speech, in one of the blocks of observations, to a subset comprising one or more of the models, representing known speech, to determine a likelihood of a match to each of the one or more models, by determining which of the state sequences of the respective model is the closest match, and how close is the match; and b) second means for comparing the two or more of the observations to models other than those in the subset;

wherein said first means and said second means iteratively compare the series of observations to the stored models to thereby recognize the unknown speech in terms of the known speech.

21. A speech recognition processor for comparing a series of observations representing unknown speech, to stored models representing known speech, by comparing the observations to stored models, the series of observations being grouped into one or more blocks each comprising two or more of the observations, the models comprising finite state machines, having multiple state sequences, the processor comprising:

a) first means for comparing two or more of the observations, representing unknown speech, in the respective block, to a subset comprising one or more of the models, representing known speech, to determine a likelihood of a match to each of the one or more models, by determining which of the state sequences of the respective model is the closest match, and how close is the match; and b) second means for comparing the two or more of the observations to models other than those in the subset, to thereby recognize the unknown speech in terms of the known speech.

* * * * *